US012627386B2

(12) United States Patent
Li et al.

(10) Patent No.: US 12,627,386 B2
(45) Date of Patent: May 12, 2026

(54) MODEL BUILDING APPARATUS AND MODEL BUILDING METHOD, ROOT CAUSE ESTIMATION APPARATUS AND ROOT CAUSE ESTIMATION METHOD, AND RECORDING MEDIUM

(71) Applicant: NEC Corporation, Tokyo (JP)

(72) Inventors: Tansheng Li, Tokyo (JP); Eiji Takahashi, Tokyo (JP); Nobuhiko Itoh, Tokyo (JP)

(73) Assignee: NEC CORPORATION, Tokyo (JP)

( * ) Notice: Subject to any disclaimer, the term of this patent is extended or adjusted under 35 U.S.C. 154(b) by 310 days.

(21) Appl. No.: 18/281,385

(22) PCT Filed: Mar. 17, 2021

(86) PCT No.: PCT/JP2021/010777
§ 371 (c)(1),
(2) Date: Sep. 11, 2023

(87) PCT Pub. No.: WO2022/195755
PCT Pub. Date: Sep. 22, 2022

(65) Prior Publication Data
US 2024/0305393 A1      Sep. 12, 2024

(51) Int. Cl.
*H04B 17/391* (2015.01)
*H04W 24/06* (2009.01)

(52) U.S. Cl.
CPC ........ *H04B 17/3912* (2015.01); *H04W 24/06* (2013.01)

(58) Field of Classification Search
CPC ........................... H04B 17/3912; H04W 24/06
See application file for complete search history.

(56) References Cited

U.S. PATENT DOCUMENTS

| | | | |
|---|---|---|---|
| 5,889,488 | A | 3/1999 | Kosaki |
| 2012/0075987 | A1 | 3/2012 | Yoneyama et al. |
| 2012/0157007 | A1 | 6/2012 | Yoneyama et al. |
| 2017/0201412 | A1 | 7/2017 | Yano et al. |
| 2019/0361759 | A1* | 11/2019 | Haugen ............... G06F 11/0772 |

(Continued)

FOREIGN PATENT DOCUMENTS

| | | |
|---|---|---|
| JP | H10-070504 A | 3/1998 |
| JP | 2008-278148 A | 11/2008 |

(Continued)

OTHER PUBLICATIONS

International Search Report for PCT Application No. PCT/JP2021/010777, mailed on Jun. 22, 2021.

(Continued)

*Primary Examiner* — Natasha W Cosme
(74) *Attorney, Agent, or Firm* — Sughrue Mion, PLLC

(57) ABSTRACT

A model building apparatus includes: an acquisition unit that obtains, from a first wireless station, time-series data of received power of wireless communication between the first wireless station and a second wireless station; a generation unit that generates input data including change data about a degree of a change in the received power per unit time, based on the time-series data; and a building unit that builds the estimation model for estimating the root cause of degradation from the input data, by machine learning using the input data.

10 Claims, 11 Drawing Sheets

(56) References Cited

U.S. PATENT DOCUMENTS

| | | | | |
|---|---|---|---|---|
| 2020/0267047 | A1* | 8/2020 | Safavi | ................. H04L 41/5067 |
| 2022/0210622 | A1 | 6/2022 | Kudo et al. | |

FOREIGN PATENT DOCUMENTS

| | | | |
|---|---|---|---|
| JP | 2012-074765 | A | 4/2012 |
| JP | 2014-116660 | A | 6/2014 |
| JP | 2017-123124 | A | 7/2017 |
| JP | 6696859 | B | 5/2020 |
| WO | 2011/030466 | A1 | 3/2011 |
| WO | 2020/217457 | A1 | 10/2020 |

OTHER PUBLICATIONS

JP Office Action for JP Application No. 2023-506582, mailed on Nov. 26, 2024 with English Translation.
JP Official Communication for JP Application No. 2023-506582, mailed on Sep. 30, 2025 with English Translation.

* cited by examiner

3

4

<u>LDS</u>

| | | SRS#n(RP#n) | | | | y#n |
|---|---|---|---|---|---|---|
| TERMINAL ID | TIME | RSRP (INSTANTANEOUS VALUE) | SINR (INSTANTANEOUS VALUE) | RSSI (INSTANTANEOUS VALUE) | RSRQ (INSTANTANEOUS VALUE) | CORRECT ANSWER LABEL |
| #1 | t#1-1 | xxxx | xxxx | xxxx | xxxx | NOT DEGRADED |
| | t#1-2 | xxxx | xxxx | xxxx | xxxx | NOT DEGRADED |
| | ... | ... | ... | ... | ... | ... |
| | t#1-11 | xxxx | xxxx | xxxx | xxxx | NOT DEGRADED |
| | t#1-12 | xxxx | xxxx | xxxx | xxxx | DEGRADED BY SHIELDING |
| | t#1-13 | xxxx | xxxx | xxxx | xxxx | DEGRADED BY SHIELDING |
| | ... | ... | ... | ... | ... | ... |
| | t#1-23 | xxxx | xxxx | xxxx | xxxx | DEGRADED BY SHIELDING |
| #2 | t#2-1 | xxxx | xxxx | xxxx | xxxx | DEGRADED BY FADING |
| | t#2-2 | xxxx | xxxx | xxxx | xxxx | DEGRADED BY FADING |
| | ... | ... | ... | ... | ... | ... |
| | t#2-21 | xxxx | xxxx | xxxx | xxxx | DEGRADED BY FADING |
| | t#2-22 | xxxx | xxxx | xxxx | xxxx | DEGRADED BY DISTANCE ATTENUATION |
| | t#2-23 | xxxx | xxxx | xxxx | xxxx | DEGRADED BY DISTANCE ATTENUATION |
| | ... | ... | ... | ... | ... | ... |
| | t#2-36 | xxxx | xxxx | xxxx | xxxx | DEGRADED BY DISTANCE ATTENUATION |
| ... | ... | ... | ... | ... | ... | ... |

LD#1 (rows for terminal ID #1)

LD#2 (rows for terminal ID #2)

FIG. 5

RSRP

APPROXIMATE CURVE
$= a_1 \times t^2 + b_1 \times t + c_1$

TIME t

RSRP

APPROXIMATE CURVE
$= a_2 \times t^2 + b_2 \times t + c_2$

TIME t

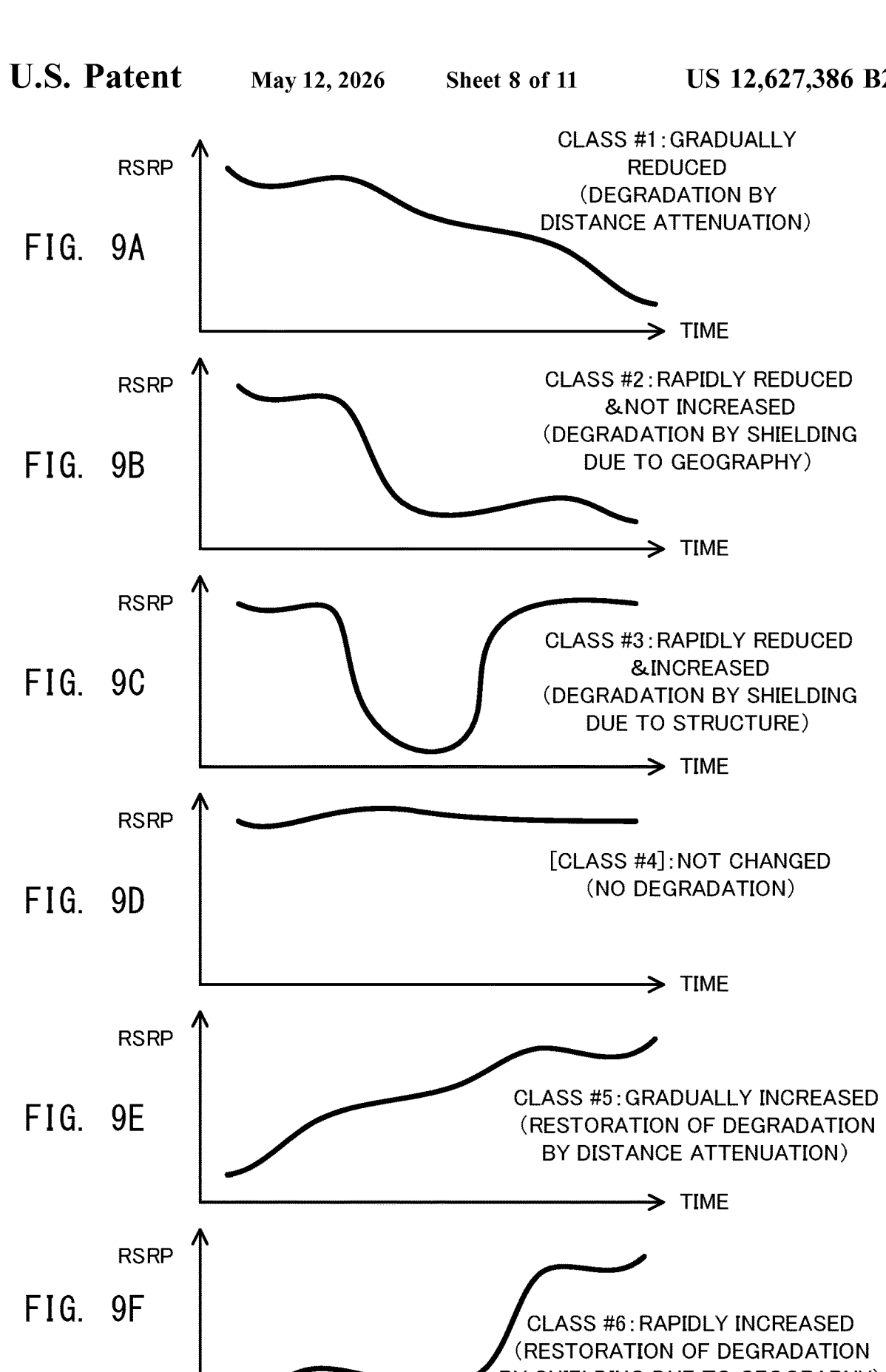

FIG. 9A

RSRP

CLASS #1 : GRADUALLY
REDUCED
(DEGRADATION BY
DISTANCE ATTENUATION)

TIME

FIG. 9B

RSRP

CLASS #2 : RAPIDLY REDUCED
&NOT INCREASED
(DEGRADATION BY SHIELDING
DUE TO GEOGRAPHY)

TIME

FIG. 9C

RSRP

CLASS #3 : RAPIDLY REDUCED
&INCREASED
(DEGRADATION BY SHIELDING
DUE TO STRUCTURE)

TIME

FIG. 9D

RSRP

[CLASS #4] : NOT CHANGED
(NO DEGRADATION)

TIME

FIG. 9E

RSRP

CLASS #5 : GRADUALLY INCREASED
(RESTORATION OF DEGRADATION
BY DISTANCE ATTENUATION)

TIME

FIG. 9F

RSRP

CLASS #6 : RAPIDLY INCREASED
(RESTORATION OF DEGRADATION
BY SHIELDING DUE TO GEOGRAPHY)

TIME

| TERMINAL ID | TIME | RSRP (MEAN VALUE) | SINR (MEAN VALUE) | RSSI (MEAN VALUE) | RSRQ (MEAN VALUE) | RSRP (VELOCITY DATA) |
|---|---|---|---|---|---|---|
| #1 | t#1-1 | xxxx | xxxx | xxxx | xxxx | xxxx |
| | t#1-2 | xxxx | xxxx | xxxx | xxxx | xxxx |
| | ... | ... | ... | ... | ... | ... |
| | t#1-11 | xxxx | xxxx | xxxx | xxxx | xxxx |
| | t#1-12 | xxxx | xxxx | xxxx | xxxx | xxxx |
| | t#1-13 | xxxx | xxxx | xxxx | xxxx | xxxx |
| | ... | ... | ... | ... | ... | ... |
| | t#1-23 | xxxx | xxxx | xxxx | xxxx | xxxx |
| #2 | t#2-1 | xxxx | xxxx | xxxx | xxxx | xxxx |
| | t#2-2 | xxxx | xxxx | xxxx | xxxx | xxxx |
| | ... | ... | ... | ... | ... | ... |
| | t#2-21 | xxxx | xxxx | xxxx | xxxx | xxxx |
| | t#2-22 | xxxx | xxxx | xxxx | xxxx | xxxx |
| | t#2-23 | xxxx | xxxx | xxxx | xxxx | xxxx |
| | ... | ... | ... | ... | ... | ... |
| | t#2-36 | xxxx | xxxx | xxxx | xxxx | xxxx |
| ... | ... | ... | ... | ... | ... | ... |

INP#1

INP#2

FIG. 10

| TERMINAL ID | TIME | ESTIMATION RESULT y' #n | | |
| | | DISTANCE ATTENUATION | SHIELDING | FADING |
|---|---|---|---|---|
| #1 | t#1-1 | 0 | 0 | 0 |
| | t#1-2 | 0 | 0 | 0 |
| | ... | ... | ... | ... |
| | t#1-11 | 0 | 0 | 0 |
| | t#1-12 | 0 | 1 | 0 |
| | t#1-13 | 0 | 1 | 0 |
| | ... | ... | ... | ... |
| | t#1-23 | 0 | 1 | 0 |
| #2 | t#2-1 | 0 | 0 | 1 |
| | t#2-2 | 0 | 0 | 1 |
| | ... | ... | ... | ... |
| | t#2-21 | 0 | 0 | 1 |
| | t#2-22 | 1 | 0 | 0 |
| | t#2-23 | 1 | 0 | 0 |
| | ... | ... | ... | ... |
| | t#2-36 | 1 | 0 | 0 |
| ... | ... | ... | ... | ... | y' #1 (brace spanning terminal #1 rows)

y' #2 (brace spanning terminal #2 rows)

FIG. 11

MODEL BUILDING APPARATUS AND MODEL BUILDING METHOD, ROOT CAUSE ESTIMATION APPARATUS AND ROOT CAUSE ESTIMATION METHOD, AND RECORDING MEDIUM

This application is a National Stage Entry of PCT/JP2021/010777 filed on Mar. 17, 2021, the contents of all of which are incorporated herein by reference, in their entirety.

TECHNICAL FIELD

This disclosure relates, for example, to technical fields of a model building apparatus, a model building method, and a recording medium that are capable of building an estimation model for estimating a root cause of degradation of communication quality between a first wireless station and a second wireless station, a model building method and a recording medium, and a root cause estimation apparatus, a root cause estimation method, and a recording medium that are capable of estimating the root cause of degradation of the communication quality between the first wireless station and the second wireless station.

BACKGROUND ART

Patent Literature 1 describes a quality estimation apparatus that estimates communication quality in wireless communication (specifically, mobile communication), by using a neural network model.

In addition, as prior art documents related to this disclosure, Patent Literature 2 to Patent Literature 4 are cited.

CITATION LIST

Patent Literature

Patent Literature 1: Japanese Patent No. 6696859
Patent Literature 2: International Publication No. WO2020/217457 pamphlet
Patent Literature 3: JP2017-123124A
Patent Literature 4: JP2008-278148A

SUMMARY

Technical Problem

When the communication quality is degraded, it is desirable to take measures to restore the degraded communication quality. Here, the measures to restore the degraded communication quality vary in many cases depending on a root cause of the degradation of the communication quality. The quality estimation apparatus described in Patent Literature 1, however, has a technical problem that it is not capable of estimating the root cause of the degradation of the communication quality.

It is an example object of this disclosure to provide a model building apparatus and a model building method, a root cause estimation apparatus and a root cause estimation method, and a recording medium that are capable of solving the above-described technical problem. As an example, it is an example object of this disclosure to provide a model building apparatus, a model building method, and a recording medium that are capable of building an estimation model for estimating a root cause of degradation of communication quality between a first wireless station and a second wireless station, a model building method and a recording medium, and a root cause estimation apparatus, a root cause estimation method, and a recording medium that are capable of estimating the root cause of degradation of the communication quality between the first wireless station and the second wireless station.

Solution to Problem

A model building apparatus according to an example aspect is a model building apparatus that builds an estimation model for estimating a root cause of degradation of communication quality between a first wireless station and a second wireless station, the model building apparatus including: an acquisition unit that obtains, from the first wireless station, time-series data of received power of wireless communication between the first wireless station and the second wireless station; a generation unit that generates input data including change data about a degree of a change in the received power per unit time, based on the time-series data; and a building unit that builds the estimation model for estimating the root cause of degradation from the input data, by machine learning using the input data.

A root cause estimation apparatus according to an example aspect is a root cause estimation apparatus that estimates a root cause of degradation of communication quality between a first wireless station and a second wireless station, the root cause estimation apparatus including: an acquisition unit that obtains, from the first wireless station, time-series data of received power of wireless communication between the first wireless station and the second wireless station; a generation unit that generates input data including change data about a degree of a change in the received power per unit time, based on the time-series data; and an estimation unit that estimates the root cause of degradation, by using the input data and an estimation model that is built by machine learning and that is for estimating the root cause of degradation from the input data.

A model building method according to an example aspect is a model building method of building an estimation model for estimating a root cause of degradation of communication quality between a first wireless station and a second wireless station, the model building method including: obtaining, from the first wireless station, time-series data of received power of wireless communication between the first wireless station and the second wireless station; generating input data including change data about a degree of a change in the received power per unit time, based on the time-series data; and building the estimation model for estimating the root cause of degradation from the input data, by machine learning using the input data.

A root cause estimation method according to an example aspect is a root cause estimation method of estimating a root cause of degradation of communication quality between a first wireless station and a second wireless station, the root cause estimation method including: obtaining, from the first wireless station, time-series data of received power of wireless communication between the first wireless station and the second wireless station; generating input data including change data about a degree of a change in the received power per unit time, based on the time-series data; and estimating the root cause of degradation, by using the input data and an estimation model that is built by machine learning and that is for estimating the root cause of degradation from the input data.

A recording medium according to a first example aspect is a recording medium that records thereon a computer program that allows a computer to execute a model building method of building an estimation model for estimating a root cause of degradation of communication quality between a first wireless station and a second wireless station, the model building method including: obtaining, from the first wireless station, time-series data of received power of wireless communication between the first wireless station and the second wireless station; generating input data including change data about a degree of a change in the received power per unit time, based on the time-series data; and building the estimation model for estimating the root cause of degradation from the input data, by machine learning using the input data.

A recording medium according to a second example aspect is a recording medium that records thereon a computer program that allows a computer to execute a root cause estimation method of estimating a root cause of degradation of communication quality between a first wireless station and a second wireless station, the root cause estimation method including: obtaining, from the first wireless station, time-series data of received power of wireless communication between the first wireless station and the second wireless station; generating input data including change data about a degree of a change in the received power per unit time, based on the time-series data; and estimating the root cause of degradation, by using the input data and an estimation model that is built by machine learning and that is for estimating the root cause of degradation from the input data.

Effect of Invention

According to the model building apparatus, the model building method, and the recording medium in the example aspects described above, it is possible to build the estimation model for estimating the root cause of degradation of the communication quality between the first wireless station and the second wireless station. In addition, according to the root cause estimation apparatus, the root cause estimation methods, and the recording medium in the example aspects described above, it is possible to estimate the root cause of degradation of the communication quality between the first wireless station and the second wireless station.

BRIEF DESCRIPTION OF DRAWINGS

FIG. 5 is a diagram illustrating an example of a data structure of a learning dataset.

FIG. 9 Each of FIG. 9A to 9F is a graph indicating a class used to classify a tendency of the time change in RSRP.

FIG. 10 is a diagram illustrating an example of a data structure of input data.

FIG. 11 is a diagram illustrating an estimation result of an estimation model.

DESCRIPTION OF EXAMPLE EMBODIMENT

With reference to the drawings, a model building apparatus and a model building method, a root cause estimation apparatus and a root cause estimation method, and a recording medium according to an example embodiment will be described below. The following describes the model building apparatus and the model building method, the root cause estimation apparatus and the root cause estimation method, and the recording medium according to the example embodiment, by using a wireless communication system SYS to which the model building apparatus and the model building method, the root cause estimation apparatus and the root cause estimation method, and the recording medium according to the example embodiment are applied.

The present invention, however, is not limited to the example embodiment described below.

<1> CONFIGURATION OF WIRELESS COMMUNICATION SYSTEM SYS

Figure 1:
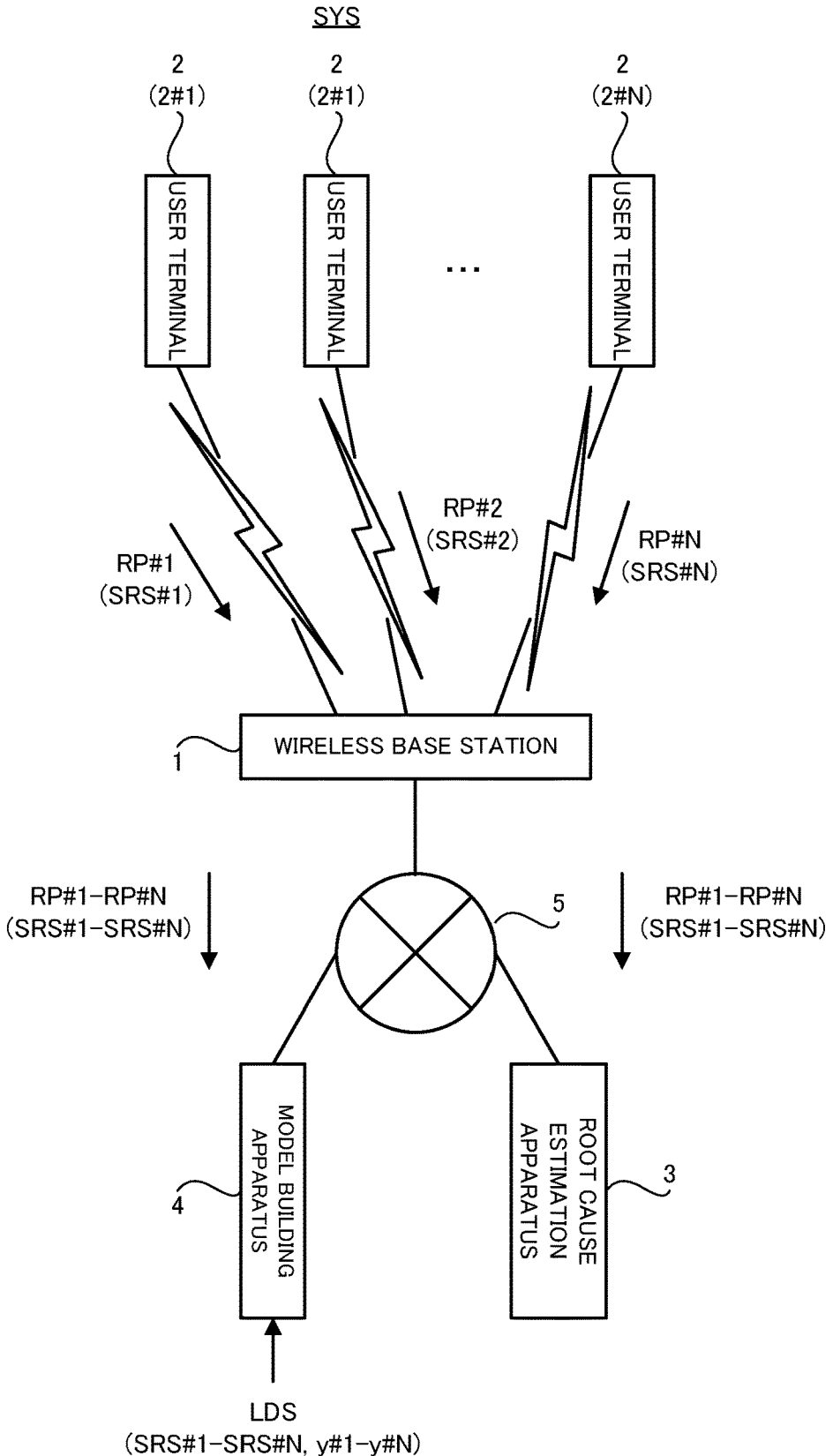
FIG. 1 is a block diagram illustrating an overall configuration of a wireless communication system according to an example embodiment.

First, a configuration of the wireless communication system SYS in the example embodiment will be described.
<1-1> Overall Configuration of Wireless Communication System SYS First, an overall configuration of the wireless communication SYS in the example embodiment will be described with reference to FIG. 1. FIG. 1 is a block diagram illustrating the overall configuration of the wireless communication system SYS according to the example embodiment.

As illustrated in FIG. 1, the wireless communication system SYS includes a wireless base station 1 that is a specific example of the "first wireless station", a user terminal 2 that is a specific example of the "second wireless station", a root cause estimation apparatus 3, and a model building apparatus 4. In the example illustrated in FIG. 1, the wireless communication SYS includes a single wireless base station 1. The wireless communication system SYS, however, may include a plurality of wireless base stations 1. Furthermore, in the example illustrated in FIG. 1, the wireless communication system SYS includes a plurality of user terminals 2 (specifically, N user terminals, where N is a constant indicating two or more integers). In the following explanation, a user terminal 2 of the N user terminals 2 is referred to as a "user terminal 2#n" as required (where n is a variable indicating an integer that is greater than or equal to 1 and that is less than or equal to the total number N of the user terminals 2). The wireless communication SYS, however, may include a single user terminal 2.

The wireless base station 1 is configured to perform wireless communication with at least one user terminal 2 that is in a cell of a predetermined size extending based on the wireless base station 1. The wireless base station 1 transmits a radio wave to the user terminal 2 and receives a radio wave transmitted from the user terminal 2, thereby enabling the wireless communication with the user terminal 2.

The user terminal 2 is configured to perform the wireless communication with the wireless base station 1 that covers the cell in which the user terminal 2 is located. The user terminal 2 transmits a radio wave to the wireless base station 1 and receives a radio wave transmitted from the wireless base station 1, thereby enabling the wireless communication with the wireless base station 1. The user terminal 2 may be referred to as a wireless terminal.

The root cause estimation apparatus 3 is configured to perform a root cause estimation operation for estimating a root cause of degradation of communication quality between the wireless base station 1 and the user terminal 2#n (i.e., the quality of the wireless communication performed between the wireless base station 1 and the user terminal 2#n).

The communication quality may include, for example, throughput. In this case, a state in which the communication quality is degraded may include a state in which the throughput is less than an allowable lower limit value. Therefore, the root cause estimation apparatus 3 may perform a root cause estimation operation for estimating a root cause of reduced throughput between the wireless base station 1 and the user terminal 2#n, as the root cause of degradation of the communication quality.

The communication quality may include, for example, delay (i.e., a delay time). In this case, a state in which the communication quality is degraded may include a state in which the delay is greater than an allowable upper limit value (i.e., the delay time is longer than the allowable upper limit value). Therefore, the root cause estimation apparatus 3 may perform a root cause estimation operation for estimating a root cause of increased delay between the wireless base station 1 and the user terminal 2#n, as the root cause of degradation of the communication quality.

In this example embodiment, the root cause estimation apparatus 3 estimates the root cause of degradation of the communication quality by using an estimation model M built by machine learning. An example of such an estimation model M is a model including a neural network. The estimation model M is a model capable of outputting an estimation result of the root cause of degradation of the communication quality between the wireless base station 1 and the user terminal 2#n, when input data INP#n are inputted, wherein the input data INP#n are generated from time-series data SRS#n of received power RP#n of the wireless communication performed between the wireless base station 1 and the user terminal 2#n. For this reason, the root cause estimation apparatus 3 obtains time-series data SRS#n of the received power of the wireless communication performed between the wireless base station 1 and the user terminal 2#n, generates the input data INP#n based on the obtained time-series data SRS#n, and estimates the root cause of degradation of the communication quality between the wireless base station 1 and the user terminal 2#n by using the generated input data INP#n and the estimation model M.

The "received power RP#n of the wireless communication performed between the wireless base station 1 and the user terminal 2#n" in the example embodiment may mean the intensity of the radio wave transmitted from the wireless base station 1 at the position of the user terminal 2#n (i.e., the intensity of the radio wave received by an antenna provided in the user terminal 2#n from the wireless base station 1). That is, the received power RP#n may mean the received power in a downstream direction. Such received power RP#n is typically measured by the user terminal 2#n that receives the radio wave transmitted by the wireless base station 1. Furthermore, information about the received power measured by the user terminal 2#n may be transmitted from the user terminal 2#n to the wireless base station 1. That is, information about received powers RP#1 to RP#N respectively measured by the N user terminals 2 may be transmitted from the respective N user terminals 2 to the wireless base station 1. In this case, the root cause estimation apparatus 3 may obtain at least one of time-series data SRS#1 of the received power RP#1 to time-series data SRS#N of the received power RP#N through a communication network 5 from the wireless base station 1. The communication network 5 may include a wireless network, or may include a wired network.

The "received power RP#n of the wireless communication performed between the wireless base station 1 and the user terminal 2#n" in the example embodiment may mean the intensity of the radio wave transmitted from the user terminal 2#n at the position of the wireless base station 1 (i.e., the intensity of the radio wave received by an antenna provided in the wireless base station from the user terminal 2#n). That is, the received power RP#n may mean the received power in an upstream direction. Such received power RP#n is typically measured by the wireless base station 1 that receives the radio wave transmitted by the user terminal 2#n. That is, the wireless base station 1 measures the received powers RP#1 to RP#N by receiving the radio waves respectively transmitted by the user terminals 2#1 to 2#N. Even in this case, the root cause estimation apparatus 3 may obtain at least one of the time-series data SRS#1 of the received power RP#1 to the time-series data SRS#N of the received power RP#N from the wireless base station 1 through the communication network 5.

In the example embodiment, the wireless communication system SYS is a 3.9 generation mobile communication system (a so-called 3.9G mobile communication system based on a LTE (Long Term Evolution) standard), a fourth generation mobile communication system (so-called 4G), or a fifth generation mobile communication system (so-called 5G). In this instance, at least one of RSSI (Received Signal Strength Indicator), RSRP (Reference Signal Received Power), RSRQ (Reference Signal Received Quality), and SINR (Signal to Interference plus Noise Ratio) may be used as the received power RP#n. The wireless communication system SYS, however, is not limited to the 3.9 generation mobile communication system, the fourth generation mobile communication system or the fifth generation mobile communication system.

The model building apparatus 4 is configured to perform a model building operation for building the estimation model M used by the root cause estimation apparatus 3 to estimate the degradation of the communication quality. As described above, the estimation model M is built by machine learning. For this reason, the model building apparatus 4 builds the estimation model M by performing the machine learning.

As described above, the estimation model M is a model capable of outputting the estimation result of the root cause of degradation of the communication quality between the wireless base station 1 and the user terminal 2#*n*, when the input data INP#n are inputted, wherein the input data INP#n are generated from the time-series data SRS#n of the received power RP#n of the wireless communication performed between the wireless base station 1 and the user terminal 2#*n*. For this reason, the model building apparatus 4 performs the machine learning for building the estimation model M, by using a learning dataset LDS including learning data LD#n including: the time-series data SRS#n of the received power RP#n of the wireless communication performed between the wireless base station 1 and the user terminal 2#*n*; and a correct answer label y#n indicating an actual root cause of degradation of the communication quality between the wireless base station 1 and the user terminal 2#*n* in a situation where the time-series data SRS#n are observed. Specifically, the model building apparatus 4 generates the input data INP#n based on the time-series data SRS#n included in the learning data LD#n, inputs the generated input data INP#n to the estimation model M, and updates parameters of the estimation model M based on a loss function about an error between the correct answer label y#n included in the learning data LD#n and the output of the estimation model M. When the estimation model M is a model including a neural network, at least one of bias and weight is an example of the parameters of the estimation model M.

The learning dataset LDS may include not only the learning data LD#n including the time-series data SRS#n observed in a situation where the communication quality of the wireless communication between the wireless base station 1 and the user terminal 2#*n* is degraded, but also the learning data LD#n including the time-series data SRS#n observed in a situation where the communication quality of the wireless communication between the wireless base station 1 and the user terminal 2#*n* is not degraded. In this instance, the correct answer label y#n included in the learning data LD#n may indicate that the communication quality is not degraded, instead of indicating the root cause of degradation of the communication quality.

The model building apparatus 4 may obtain the time-series data SRS#n of the received power RP#n from the wireless base station 1 through the communication network 5, and may use the obtained time-series data SRS#n as a part of the learning data LD#n. In this instance, the model building apparatus 4 may obtain information about the correct answer label y#n, in parallel with the acquisition of the time-series data SRS#n. Alternatively, the model building apparatus 4 may obtain the learning dataset LDS prepared in advance.

<1-2> Structure of Root Cause Estimation Apparatus 3

Figure 2:
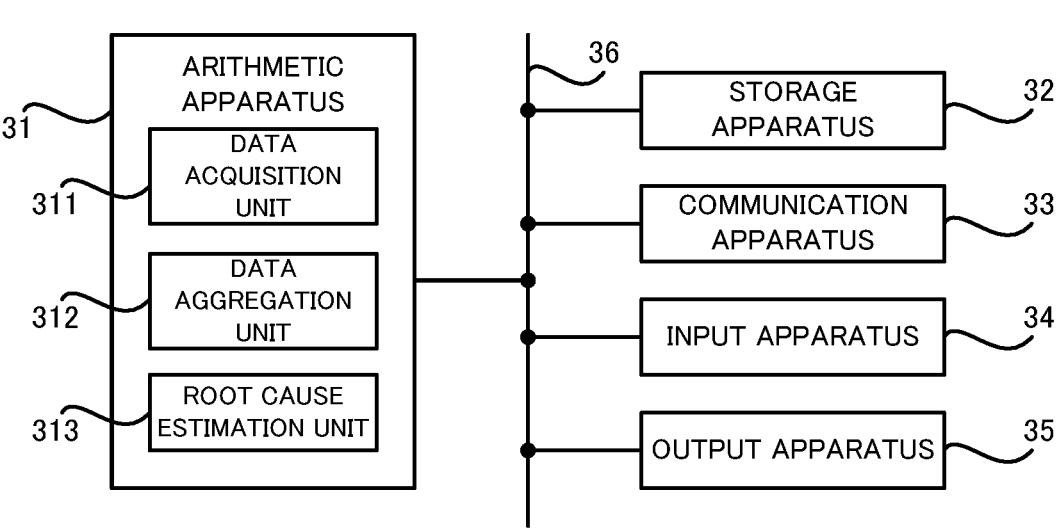
FIG. 2 is a block diagram illustrating a configuration of a root cause estimation apparatus according to the example embodiment.

Next, a configuration of the root cause estimation apparatus 3 will be described with reference to FIG. 2. FIG. 2 is a block diagram illustrating the configuration of the root cause estimation apparatus 3.

As illustrated in FIG. 2, the root cause estimation apparatus 3 includes an arithmetic apparatus 31, a storage apparatus 32, and a communication apparatus 33. In addition, the root cause estimation apparatus 3 may include an input apparatus 34 and an output apparatus 35. The root cause estimation apparatus 3, however, may not include at least one of the input apparatus 34 and the output apparatus 35. The arithmetic apparatus 31, the storage apparatus 32, the communication apparatus 33, the input apparatus 34, and the output apparatus 35 may be connected through a data bus 36.

The arithmetic apparatus 31 includes at least one of, for example, a CPU (Central Processing Unit), a GPU (Graphics Processing Unit), and a FPGA (Field Programmable Gate Array). The arithmetic apparatus 31 reads a computer program. For example, the arithmetic apparatus 31 may read a computer program stored in the storage apparatus 32. For example, the arithmetic apparatus 31 may read a computer program stored by a computer-readable and non-transitory recording medium, by using a not-illustrated recording medium reading apparatus provided in the root cause estimation apparatus 3. The arithmetic apparatus 31 may obtain (i.e., download or read) a computer program from a not-illustrated apparatus disposed outside the root cause estimation apparatus 3, through the communication apparatus 33 (or another communication apparatus). The arithmetic apparatus 31 executes the read computer program. Consequently, a logical function block for performing an operation to be performed by the root cause estimation apparatus 3 (e.g., the above-described root cause estimation operation) is realized or implemented in the arithmetic apparatus 31. That is, the arithmetic apparatus 31 is allowed to function as a controller for realizing or implementing the logical functional block for performing the operation (in other words, a process) to be performed by the root cause estimation apparatus 3.

FIG. 2 illustrates an example of the logical functional block realized or implemented in the arithmetic apparatus 31 to perform the root cause estimation operation. As illustrated in FIG. 2, in the arithmetic apparatus 31, a data acquisition unit 311 that is a specific example of the "acquisition unit", a data aggregation unit 312 that is a specific example of the "generation unit", and a root cause estimation unit 313 that is a specific example of the "estimation unit" are realized or implemented. Although the respective operations of the data acquisition unit 311, the data aggregation unit 312, and the root cause estimation unit 313 will be described in detail later, an outline thereof will be briefly described here. The data acquisition unit 311 obtains the time-series data SRS#n of the received power RP#n from the wireless base station 1. The data aggregation unit 312 generates the input data INP#n, based on the time-series data SRS#n of the received power RP#n obtained by the data acquisition unit 311. The root cause estimation unit 313 estimates the root cause of degradation of the communication quality between the wireless base station 1 and the user terminal 2#*n*, by using the input data INP#n generated by the data aggregation unit 312 and the estimation model M.

The storage apparatus 32 is configured to store desired data. For example, the storage apparatus 32 may temporarily store a computer program to be executed by the arithmetic apparatus 31. The storage apparatus 32 may temporarily store data that are temporarily used by the arithmetic apparatus 31 when the arithmetic apparatus 31 executes the computer program. The storage apparatus 32 may store data that are stored by the root cause estimation apparatus 3 for a long time. The storage apparatus 32 may include at least one of a RAM (Random Access Memory), a ROM (Read Only Memory, a hard disk apparatus, a magneto-optical disk apparatus, a SSD (Solid State Drive) and a disk array apparatus. That is, the storage apparatus 32 may include a non-transitory recording medium.

The communication apparatus 33 is configured to communicate with the wireless base station 1 through the communication network 5. In the example embodiment, the communication apparatus 33 receives (i.e., obtains) the time-series data SRS#n of the received power RP#n from the wireless base station 1 through the communication network 5.

The input apparatus 34 is an apparatus that receives an input of information to the root cause estimation apparatus 3 from the outside of the root cause estimation apparatus 3.

For example, the input apparatus 34 may include an operating apparatus (e.g., at least one of a keyboard, a mouse, and a touch panel) that is operable by an operator of the root cause estimation apparatus 3. For example, the input apparatus 34 may include a reading apparatus that is configured to read information recorded as data on a recording medium that can be externally attached to the root cause estimation apparatus 3.

The output apparatus 35 is an apparatus that outputs information to the outside of the root cause estimation apparatus 3. For example, the output apparatus 35 may output the information as an image. That is, the output apparatus 35 may include a display apparatus (a so-called display) that is configured to display an image indicating the information that is desirably outputted.

For example, the output apparatus 35 may output information as audio. That is, the output apparatus 35 may include an audio apparatus (a so-called speaker) that is configured to output the audio. For example, the output apparatus 35 may output information on a paper surface. That is, the output apparatus 35 may include a print apparatus (a so-called printer) that is configured to print desired information on the paper surface.

<1-3> Configuration of Model Building Apparatus 4

Figure 3:
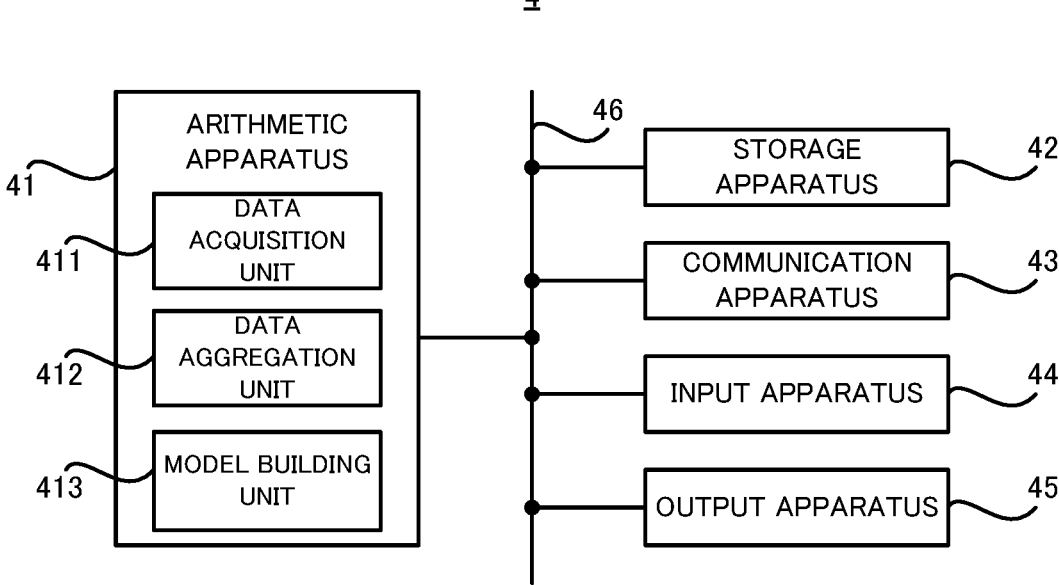
FIG. 3 is a block diagram illustrating a configuration of a model building apparatus according to the example embodiment.

Next, a configuration of the model building apparatus 4 will be described with reference to FIG. 3. FIG. 3 is a block diagram illustrating the configuration of the model building apparatus 4.

As illustrated in FIG. 3, the model building apparatus 4 includes an arithmetic apparatus 41, a storage apparatus 42, and a communication apparatus 43. In addition, the model building apparatus 4 may include an input apparatus 44 and an output apparatus 45. The model building apparatus 4, however, may not include at least one of the input apparatus 44 and the output apparatus 45. The arithmetic apparatus 41, the storage apparatus 42, the communication apparatus 43, the input apparatus 44, and the output apparatus 45 may be connected through a data bus 46.

The arithmetic apparatus 41 includes, for example, at least one of a CPU, a GPU and a FPGA. The arithmetic apparatus 41 reads a computer program. For example, the arithmetic apparatus 41 may read a computer program stored in the storage apparatus 42. For example, the arithmetic apparatus 41 may read a computer program stored by a computer-readable and non-transitory recording medium, by using a not-illustrated recording medium reading apparatus provided in the model building apparatus 4. The arithmetic apparatus 41 may obtain (i.e., download or read) a computer program from a not-illustrated apparatus disposed outside the model building apparatus 4, through a communication apparatus 43 (or another communication apparatus). The arithmetic apparatus 41 executes the read computer program. Consequently, a logical functional block for performing an operation to be performed by the model building apparatus 4 (e.g., the above-described model building operation) is realized or implemented in the arithmetic apparatus 41. That is, the arithmetic apparatus 41 is allowed to function as a controller for realizing or implementing the logical functional block for performing the operation (in other words, a process) to be performed by the model building apparatus 4.

FIG. 3 illustrates an example of the logical functional block realized or implemented in the arithmetic apparatus 41 to perform the model building operation. As illustrated in FIG. 3, in the arithmetic apparatus 41, a data acquisition unit 411 that is a specific example of the "acquisition unit", a data aggregation unit 412 that is a specific example of the "generation unit", and a model building unit 413 that is a specific example of the "building unit" are realized or implemented. Although the respective operations of the data acquisition unit 411, the data aggregation unit 412, and the model building unit 413 will be described in detail later, an outline thereof will be briefly described here. The data acquisition unit 411 obtains the learning dataset LDS. The data aggregation unit 412 generates at least one of input data INP#1 to INP#N, based on at least one of the time-series data SRS#1 of the received power RP#1 to the time-series data SRS#N of the received power RP#N included in the learning dataset LDS obtained by the data acquisition unit 411. The model building unit 413 performs the machine learning for building the estimation model M, by using at least one of the input data INP#1 to INP#N generated by the data gathering unit 412 and at least one of correct answer labels y#1 to y#N included in the learning dataset LDS.

The storage apparatus 42 is configured to store desired data. For example, the storage apparatus 42 may temporarily store a computer program to be executed by the arithmetic apparatus 41. The storage apparatus 42 may temporarily store data that are temporarily used by the arithmetic apparatus 41 when the arithmetic apparatus 41 executes the computer program. The storage apparatus 42 may store data that are stored by the model building apparatus 4 for a long time. The storage apparatus 42 may include at least one of a RAM, a ROM, a hard disk apparatus, a magneto-optical disk apparatus, a SSD, and a disk array apparatus. That is, the storage apparatus 42 may include a non-transitory recording medium.

The communication apparatus 43 is configured to communicate with the wireless base station 1 through the communication network 5. In the example embodiment, the communication apparatus 43 may receive (i.e., obtain) at least one of the time-series data SRS#1 of the received power RP#1 to the time-series data SRS#N of the received power RP#N from the wireless base station 1 through the communication network 5.

The input apparatus 44 is an apparatus that receives an input of information to the model building apparatus 4 from the outside of the model building apparatus 4. For example, the input apparatus 44 may include an operating apparatus (e.g., at least one of a keyboard, a mouse, and a touch panel) that is operable by an operator of the model building apparatus 4. For example, the input apparatus 44 may include a reading apparatus that is configured to read information stored as data on a recording medium that can be externally attached to the model building apparatus 4.

The output apparatus 45 is an apparatus that outputs information to the outside of the model building apparatus 4. For example, the output apparatus 45 may output the information as an image. That is, the output apparatus 45 may include a display apparatus (a so-called display) that is configured to display an image indicating the information that is desirably outputted. For example, the output apparatus 45 may output information as audio. That is, the output apparatus 45 may include an audio apparatus (a so-called speaker) that is configured to output the audio. For example, the output apparatus 45 may output information on a paper surface. That is, the output apparatus 45 may include a print apparatus (a so-called printer) that is configured to print desired information on the paper surface.

<2> OPERATION PERFORMED IN WIRELESS
COMMUNICATION SYSTEM SYS

Next, the operation performed in the wireless communication SYS will be described. As described above, in the wireless communication system SYS, the model building apparatus 4 performs the model building operation for building the estimation model M. Furthermore, in the wireless communication system SYS, the root cause estimation apparatus 3 performs the root cause estimation operation for estimating the root cause of degradation of the communication quality, by using the estimation model M built by the model building operation. For this reason, the model building operation and the root cause estimation operation will be described in order below.

<2-1> Model Building Operation performed by Model Building Apparatus 4

Figure 4:
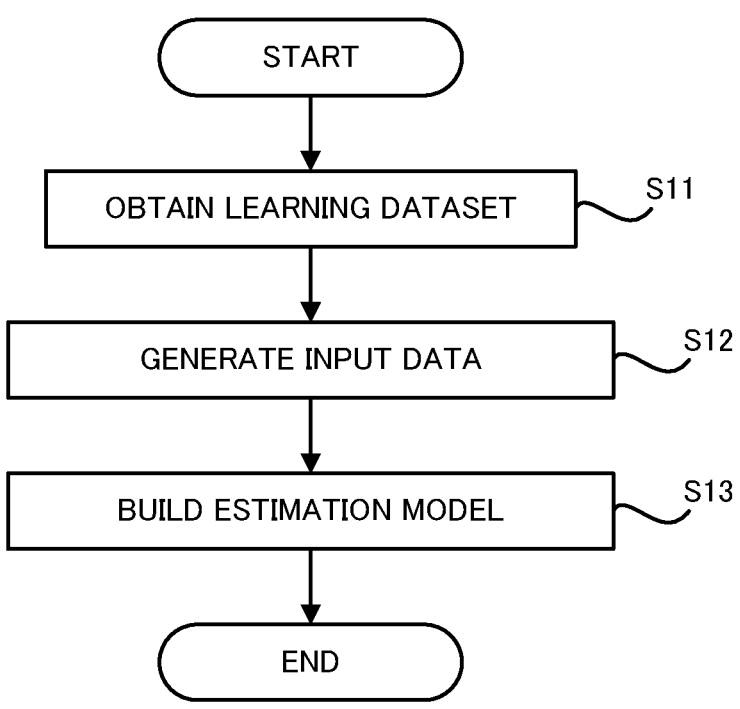
FIG. 4 is a flowchart illustrating a flow of a model building operation performed by the model building apparatus.

First, the model building operation performed by the model building apparatus 4 will be described with reference to FIG. 4. FIG. 4 is a flowchart illustrating a flow of the model building operation performed by the model building apparatus 4. As illustrated in FIG. 4, the data acquisition unit 411 obtains the learning dataset LDS (step S11).

For example, the data acquisition unit 411 may obtain the time-series data SRS#1 of the received power RP#1 to the time-series data SRS#N of the received power RP#N, respectively, as a part of learning data LD#1 to LD#N (i.e., a part of the learning dataset LDS) from the wireless base station 1 through the communication network 5. When the wireless base station 1 does not have at least one of the time-series data SRS#1 to SRS#N, the data acquisition unit 411 may not obtain at least one of the time-series data SR#1 to SRS#N that is not possessed by the wireless base station 1. In addition, the data acquisition unit 411 may obtain information about the correct answer labels y#1 to y#N as another part of the learning data LD#1 to LD#N (i.e., another part of the learning dataset LDS), respectively, in parallel with the acquisition of the time-series data SRS#1 to SRS#N. The correct answer labels y#1 to y#N may be inputted to the model building apparatus 4 by the operator of the model building apparatus 4.

It is preferable that the data acquisition unit 411 obtains the time-series data SRS#1 to SRS#N from the wireless base station 1, in a situation where the wireless base station 1 and the N user terminals 2 are in the same environment as an implementation environment of the wireless base station 1 and the N user terminals 2 when the root cause estimation apparatus 3 actually estimates the root cause of degradation. That is, it is preferable that the data acquisition unit 411 obtains the time-series data SRS#1 to RS#N from the wireless base station 1, in a situation where the wireless base station 1 and the N user terminals 2 are provided in a location of actual use. The data acquisition unit 411, however, may obtains the time-series data SRS#1 to RS#N from the wireless base station 1, in a situation where the wireless base station 1 and the N user terminals 2 are provided in a location that is different from the location of actual usage.

For example, the data acquisition unit 411 may obtain the learning dataset LDS prepared in advance. For example, when the learning dataset LDS is stored in the storage apparatus 42, the data acquisition unit 411 may obtain the learning dataset LDS from the storage apparatus 42. For example, when the learning dataset LDS is recorded on a recording medium that can be externally attached to the model building LDS 4, the data acquisition unit 411 may obtain the learning dataset LDS from the recording medium by using a recording medium reading apparatus (e.g., the input apparatus 44) provided in the model building apparatus 4. For example, when the learning dataset LDS is recorded on an external apparatus (e.g., a server) of the model building apparatus 4, the data acquisition unit 411 may obtain the learning dataset LDS from the external apparatus by using the communication apparatus 43.

It is preferable that the learning dataset LDS prepared in advance includes the time-series data SRS#1 to SRS#N obtained in the situation where the wireless base station 1 and the N user terminals 2 are provided in the location of actual use. The learning dataset LDS prepared in advance may include the time-series data SRS#1 to SRS#N obtained in the situation where the wireless base station 1 and the N user terminals 2 are provided in the location that is different from the location of actual use.

FIG. 5 illustrates an example of a data structure of the learning dataset LDS. As illustrated in FIG. 5, the learning dataset LDS includes at least one of the learning data LD#1, at least one of the learning data LD#2, . . . , and at least one of the learning data LD#N. The learning dataset LDS, however, may not include at least one of the learning data LD#1 to the learning data LD#N.

The learning data LD#n include the time-series data SRS#n of the received power RP#n of the wireless communication performed between the wireless base station 1 and the user terminal 2#n. In addition, the learning data LD#n include the correct answer label y#n indicating the actual root cause of degradation of the communication quality between the wireless base station 1 and the user terminal 2#n in the situation where the time-series data SRS#n included in the learning data LD#n are observed.

In the example illustrated in FIG. 5, the learning dataset LDS includes the learning data LD#1 and the learning data LD#2. The learning data LD#1 include the time-series data SRS#1 of the received power RP#1 observed from a time t#1-1 to a time t#1-23. Furthermore, the learning data LD#1 include the correct answer label y#1 indicating the actual root cause of degradation of the communication quality between the wireless base station 1 and the user terminal 2#1 from the time t#1-1 to the time t#1-23. Specifically, the learning data LD#1 include the correct answer label y#1 indicating that the communication quality between the wireless base station 1 and the user terminal 2#1 is not degraded from the time t#1-1 to the time t#1-11, and indicating that the actual root cause of degradation of the communication quality between the wireless base station 1 and the user terminal 2#1 is "shielding" from the time t#1-12 to the time t#1-23. In addition, the learning data LD#2 include the time-series data SRS#2 of the received power RP#2 observed from time a t#2-1 to a time t#2-36. In addition, the learning data LD#2 include the correct answer label y#2 indicating the actual root cause of degradation of the communication quality between the wireless base station 1 and the user terminal 2#2 from the time t#2-1 to the time t#2-36. Specifically, the learning data LD#2 include the correct answer label y#2 indicating that the actual root cause of degradation of the communication quality between the wireless base station 1 and the user terminal 2#2 is "fading" from the time t#2-1 and the time t#2-21, and indicating that the actual root cause of degradation of the communication quality between the wireless base station 1 and the user terminal 2#2 is "distance attenuation" from the time t#2-22 to the time t#2-36.

In the example illustrated in FIG. 5, in the learning dataset LDS, the correct answer label y#n indicates a single root cause of degradation. The communication quality between the wireless base station 1 and the user terminal 2#n, however, may be degraded by a plurality of root cause of degradations. For example, the communication quality between the wireless base station 1 and the user terminal 2#n may be degraded by the fading and the distance attenuation.

Therefore, the correct answer label y#n may indicate a plurality of root cause of degradations, as the actual root cause of degradation of the communication quality between the wireless base station 1 and the user terminal 2#*n*.

A "state in which the communication quality is degraded by the shielding" may include a state in which the communication quality is degraded due to the presence of a physical obstacle that blocks the radio wave (i.e., interferes with the propagation of the radio wave) between the wireless base station 1 and the user terminal 2. The obstacle may include a structure represented by buildings and vehicles, or may include topographical features represented by mountains and hills, or the like. A "state in which the communication quality is degraded by the fading" may include a state in which the communication quality is degraded by the occurrence of at least one of coherent fading (so-called multipath), polarization fading, skip fading, absorption fading, selective fading, and K fading. A "state in which the communication quality is degraded by the distance attenuation" may include a state in which the communication quality is degraded because a distance between the wireless base station 1 and the user terminal 2 is longer than a proper distance that allows proper wireless communication.

Referring back to FIG. 4, then, the data aggregation unit 412 generates the input data INP#n based on the time-series data SRS#n included in the learning dataset LDS obtained in the step S11 (step S12). The input data INP#n are also data that are generated by the root cause estimation apparatus 3 based on the time-series data SRS#n, as data to be inputted to the estimation model M, when the root cause estimation apparatus 3 estimates the root cause of degradation of the communication quality. Therefore, the data aggregation unit 412 generates the input data INP#n based on the time-series data SRS#n, as in the root cause estimation apparatus 3. Therefore, the description of the generation of the input data INP#n in the model building operation can be diverted as the description of the generation of the input data INP#n in the root cause estimation operation.

For example, the learning dataset LDS includes the time-series data SRS#n indicating an instantaneous value of the received power RP#n at each time t. In this instance, the data aggregation unit 412 may calculate, at each time t, a mean value of the received power RP#n during a certain period (e.g., 100 milliseconds) including each time t, and may generate the input data INP#n including information data about the calculated mean value. For example, the data aggregation unit 412 may generate the input data INP#n including data about a mean value of RSSI that is an example of the received power RP#n. For example, the data aggregation unit 412 may generate the input data INP#n including data about a mean value of RSRP that is an example of the received power RP#n. For example, the data aggregation unit 412 may generate the input data INP#n including data about a mean value of RSRQ that is an example of the received power RP#n. For example, the data aggregation unit 412 may generate the input data INP#n including data about a mean value of SINR that is an example of the received power RP#n.

Alternatively, the data aggregation unit 412 may generate the input data INP#n including the time-series data SRS#n included in the learning dataset LDS. That is, the data aggregation unit 412 may use the time-series data SRS#n as at least a part of the input data INP#n. For example, when the learning dataset LDS includes the time-series data SRS#n indicating the mean value of the received power RP#n at each time t, the data aggregation unit 412 may generate the input data SRS#n including the time-series data SRS#n indicating the mean value of the received power RP#n included in the learning dataset LDS.

As the mean value in the example embodiment, typically, a moving average value is used. As the mean value, however, in addition to or instead of the moving average value, at least one of an arithmetic mean value (i.e., an additive mean value), a geometric mean value (i.e., a geometric mean value), a weighted mean value, a harmonic mean value and a logarithmic mean value may be used.

Especially in the example embodiment, the data aggregation unit 412 generates the input data INP#n including change data about a degree of change per unit time in RSRP that is an example of the received power RP#n. When the input data INP#n including the change data about the degree of the change in RSRP per unit time are used, it is possible to build the estimation model M capable of estimating whether the root cause of degradation of the communication quality is the distance attenuation or the shielding, with higher accuracy than that when the input data INP#n including the change data about the degree of the changes in RSRP per unit time are not used. That is, when the estimation model M is built by using the input data INP#n including the change data about the degree of the change in RSRP per unit time, the model building apparatus 4 is allowed to build the estimation model M capable of estimating whether the root cause of degradation of the communication quality is the distance attenuation or the shielding, with higher accuracy than that when the estimation model M is built without using the input data INP#n including the change data about the degree of the change in RSRP per unit time. Consequently, when the root cause of degradation of the communication quality is estimated by using the input data INP#n including the change data about the degree of the change in RSRP per unit time, the root cause estimation apparatus 3 is allowed to estimate whether the root cause of degradation of the communication quality is the distance attenuation or the shielding, with higher accuracy than that when the root cause of degradation of the communication quality is estimated without using the input data INP#n including the change data about the degree of the change in RSRP per unit time. Hereinafter, the reason will be described with reference to FIG. 6A and FIG. 6B, and FIG. 7A and FIG. 7B.

In the following, velocity data about a change velocity of RSRP will be described as the change data. As the change data, however, data about any index value that is different from the change velocity of RSRP, but represents the degree of the change in RSRP per unit time may be used.

Figure 6A:
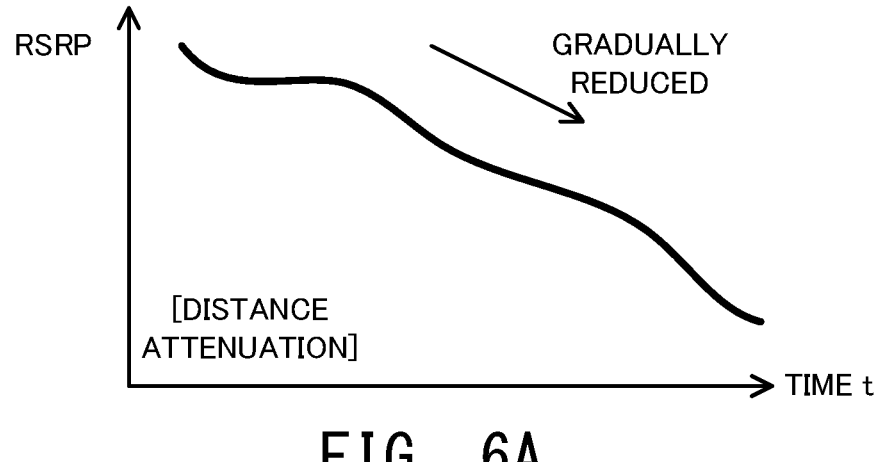
FIG. 6A is a graph illustrating a time change in RSRP (Reference Signal Received Power) when the communication quality begins to be degraded by distance attenuation.
Figure 6B:
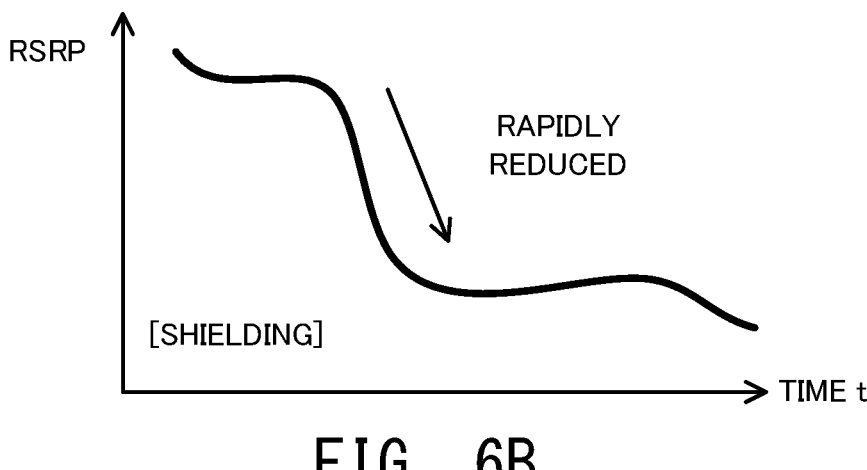
FIG. 6B is a graph illustrating a time change in RSRP when the communication quality begins to be degraded by shielding.

FIG. 6A is a graph illustrating a time change in RSRP when the communication quality begins to be degraded by the distance attenuation, whereas FIG. 6B is a graph illustrating a time change in RSRP when the communication quality begins to be degraded by the shielding. When the communication quality begins to be degraded by the distance attenuation, the communication quality is likely to be degraded relatively gradually, because the distance between the wireless base station 1 and the user terminal 2 is gradually increased. On the other hand, when the communication quality begins to be degraded by the shielding, the communication quality is likely to be degraded relatively rapidly, because a physical obstacle appears between the wireless base station 1 and the user terminal 2. Consequently, as illustrated in FIG. 6A and FIG. 6B, when the communication quality begins to be degraded by the distance attenuation, the change velocity of RSRP (in this case, a reduction velocity) becomes lower than that when the communication quality begins to be degraded by the shielding. That is, the degree of the change in RSRP per unit time is reduced. Specifically, RSRP is reduced relatively gradually with a relatively slow degradation of the communication quality. Therefore, the reduction velocity of RSRP becomes relatively low. In other words, when the communication quality begins to be degraded by the shielding, the change velocity of RSRP (in this case, the reduction velocity) becomes higher than that when the communication quality begins to be degraded by the distance attenuation. That is, the degree of the change in RSRP per unit time is increased. Specifically, RSRP is reduced relatively rapidly with a relatively rapid degradation of the communication quality. Therefore, the change velocity of RSRP becomes relatively high. Consequently, the change velocity of RSRP (in this case, the reduction velocity) can be used as an index value for estimating whether the root cause of degradation of the communication quality is the distance attenuation or the shielding.

Figure 7A:
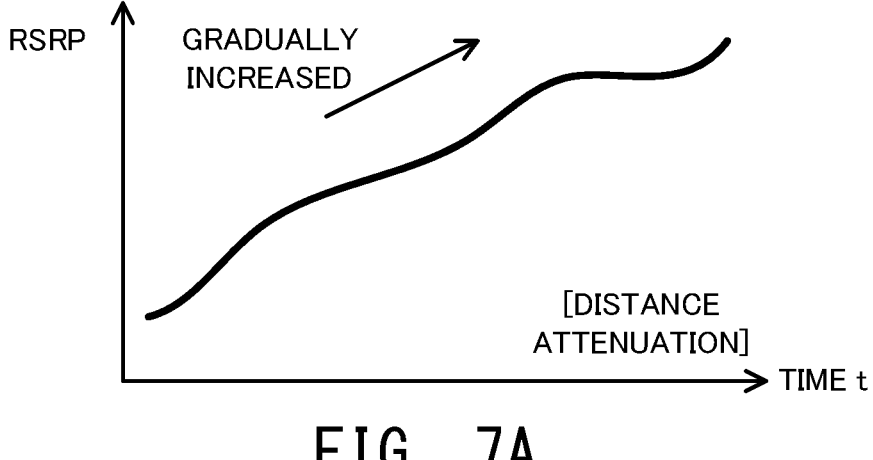
FIG. 7A is a graph illustrating a time change in RSRP when the communication quality degraded by the distance attenuation begins to be restored.
Figure 7B:
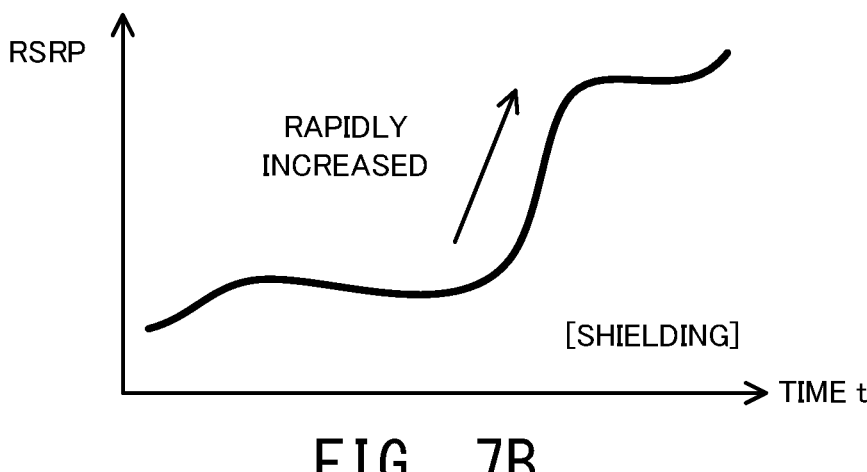
FIG. 7B is a graph illustrating a time change in RSRP when the communication quality degraded by the shielding begins to be restored.

Furthermore, FIG. 7A is a graph illustrating a time change in RSRP when the communication quality degraded by the distance attenuation begins to be restored, whereas FIG. 7B is a graph illustrating a time change in RSRP when the communication quality degraded by the shielding begins to be restored. When the communication quality degraded by the distance attenuation begins to be restored, the communication quality is likely to be restored relatively gradually, because the distance between the wireless base station 1 and the user terminal 2 is gradually reduced. On the other hand, when the communication quality degraded by the shielding begins to be restored, the communication quality is likely to be restored relatively rapidly, because the physical obstacle disappears between the wireless base station 1 and the user terminal 2. Consequently, as illustrated in FIG. 7A and FIG. 7B, when the communication quality degraded by the distance attenuation begins to be restored, the change velocity of RSRP (in this case, an increase velocity) becomes lower than that when the communication quality degraded by the shielding begins to be restored. That is, the degree of the change in RSRP per unit time is reduced. Specifically, RSRP is increased relatively gradually with a relatively slow restoration of the communication quality. Therefore, the increase velocity of RSRP becomes relatively low. In other words, when the communication quality degraded by the shielding begins to be restored, the change velocity of RSRP (in this case, the increased velocity) becomes higher than that when the communication quality degraded by the distance attenuation begins to be restored. That is, the degree of the change in RSRP per unit time is increased. Specifically, RSRP is increased relatively rapidly with a relatively rapid restoration of the communication quality. Therefore, the increase velocity of RSRP becomes relatively high. Consequently, the change velocity of RSRP (in this case, the increase velocity) can be used as an index value for estimating whether the root cause of degradation of the communication quality is the distance attenuation or the shielding.

The data aggregation unit 412 may calculate any index value capable of representing the change velocity of RSRP included as the time-series data SRS#n in the learning data LD#n, and may generate the input data INP#n including data about the calculated index value as the velocity data. Specifically, the data aggregation unit 412 may calculate any index value capable of distinguishing between a state in which the change velocity of RSRP included in the learning data LD#n is relatively high and a state in which the change velocity of RSRP included in the learning data LD#n is relatively low, and may generate the input data INP#n including data about the calculated index value as the velocity data. An example of the velocity data will be described below.

Figure 8A:
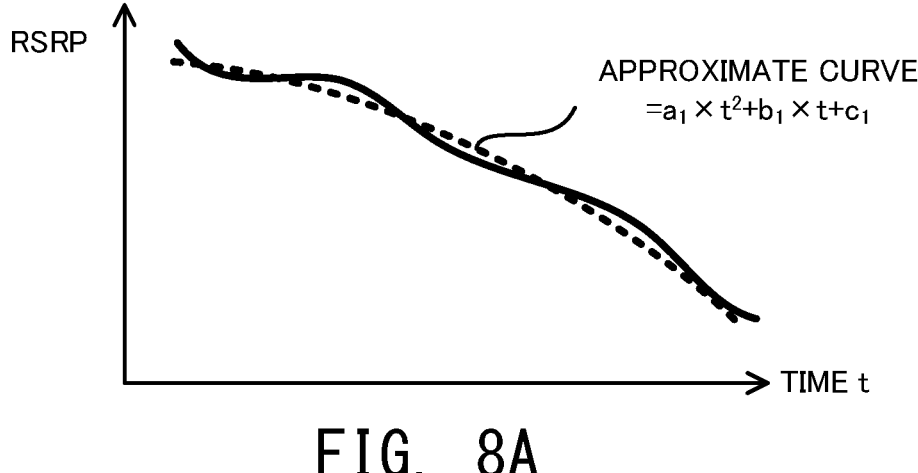
FIG. 8A is a graph illustrating an approximate curve for approximating RSRP when the communication quality begins to be degraded by the distance attenuation.
Figure 8B:
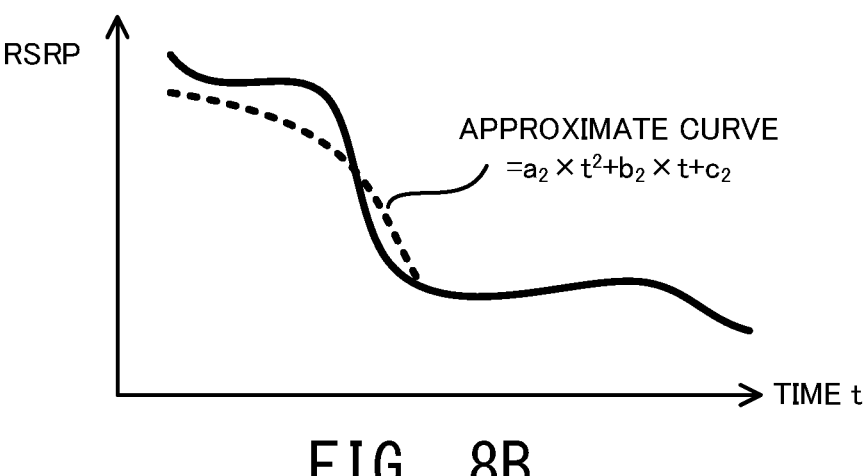
FIG. 8B is a graph illustrating an approximate curve for approximating RSRP when the communication quality begins to be degraded by the shielding.

The data aggregation unit 412 may calculate a coefficient of an approximate expression for approximating RSRP included as the time-series data SRS#n in the learning data LD#n (specifically, for approximating the time change in RSRP), and may generate the input data INP#n including data about the calculated coefficient as the velocity data. For example, FIG. 8A is a graph illustrating an approximate curve representing a quadratic polynomial "$a_1 \times t^2 + b_1 \times t + c_1$" for approximating RSRP when the communication quality begins to be degraded by the distance attenuation. On the other hand, FIG. 8B is a graph illustrating an approximate curve representing a quadratic polynomial "$a_2 \times t^2 + b_2 \times t + c_2$" for approximating RSRP when the communication quality begins to be degraded by the shielding. As illustrated in FIG. 8A and FIG. 8B, when the communication quality begins to be degraded by the distance attenuation, an absolute value of a quadratic coefficient of the quadratic polynomial representing the approximate curve is less than that when the communication quality begins to be degraded by the shielding. That is, a relation of "$|a1| < |a2|$" holds between a quadratic coefficient a1 of the quadratic polynomial for approximating RSRP with a relatively low reduction velocity, and a quadratic coefficient a2 of the quadratic polynomial for approximating RSRP with a relatively high reduction velocity.

Although this is not illustrated, the same relation is established even when the degraded communication quality is restored. Therefore, the quadratic coefficient of the quadratic polynomial for approximating RSRP can be used as any index value capable of representing the change velocity of RSRP. Specifically, the quadratic coefficient of the quadratic polynomial for approximating RSRP can be used as any index value capable of distinguishing between the state in which the change velocity of RSRP is relatively high and the state in which the change velocity of RSRP is relatively low.

As long as not only the quadratic coefficient of the quadratic polynomial for approximating RSRP, but also any coefficient of any approximate expression for approximating RSRP is capable of distinguishing between the state in which the change velocity of RSRP is relatively high and the state in which the change velocity of RSRP included in the learning data LD#n is relatively low, the data aggregation unit 412 may generate the input data INP#n including data about the any coefficient as the velocity data. For example, the data aggregation unit 412 may calculate any coefficient of a k-order polynomial (where k is an integer of 1 or more) for approximating RSRP included in the learning data LD#n, and may generate the input data INP#n including data about the calculated coefficient as the velocity data. For example, the data aggregation unit 412 may calculate any coefficient of an approximate expression that uses at least one of a linear function, a nonlinear function, an exponential function, and a logarithmic function to approximate RSRP included in the learning data LD#n, and may generate the input data INP#n including data about the calculated coefficient as the velocity data.

The data aggregation unit 412 may calculate a variance of RSRP included as the time-series data SRS#n in the learning data LD#n, and may generate the input data INP#n including data about the calculated variance as the velocity data. The data aggregation unit 412 may calculate a standard deviation of RSRP included as the time-series data SRS#n in the learning data LD#n, and may generate the input data INP#n including data about the calculated standard deviation as the velocity data. This is because RSRP varies relatively significantly as RSRP changes rapidly, and thus, each of the variance and the standard deviation of RSRP becomes relatively large. Therefore, when the communication quality begins to be degraded by the distance attenuation (i.e., when the communication quality is degraded relatively gradually), each of the variance and the standard deviation of RSRP becomes relatively small, as compared with the case where the communication quality begins to be degraded by the shielding (i.e., when the communication quality is degraded relatively rapidly). Although this is not illustrated, the same relation is established even when the degraded communication quality is restored. Therefore, each of the variance and the standard deviation of RSRP can be used as any index value capable of representing the change velocity of RSRP. Specifically, each of the variance and the standard deviation of RSRP can be used as any index value capable of distinguishing between the state in which the change velocity of RSRP is relatively high and the state in which the change velocity of RSRP is relatively low.

The data aggregation unit 412 may classify a tendency of the time change in RSRP in accordance with the change velocity of RSRP included as the time-series data SRS#n in the learning data LD#n, and may generate the input data INP#n including data about a classification result as the velocity data. For example, the data aggregation unit 412 may classify the tendency of the time change in RSRP by using a classification model that outputs the classification result of the tendency of the time change in RSRP when the time-series data SRS#n of RSRP are inputted. In this instance, the data aggregation unit 412 may generate the input data INP#n including data about an output of the classification model as the velocity data. The classification model is preferably a model to which the time-series data can be inputted. An example of the model to which such series data can be inputted is a neural network including LSTM (Long Short Term Memory).

The data aggregating unit 412 may classify the tendency of the time change in RSRP into any one of T types of classes (where T is a constant indicating an integer of two or more). For example, the data aggregation unit 412 may classify the tendency of the time change in RSRP into any one of six types of classes, as illustrated in FIG. 9A to FIG. 9F. FIG. 9A illustrates Class#1 where RSPR is reduced relatively gradually. The Class#1 typically corresponds to the tendency of the time change in RSRP when the communication quality begins to be degraded by the distance attenuation. FIG. 9B illustrates Class#2 where RSPR is not increased immediately after being reduced relatively rapidly. The Class#2 typically corresponds to the tendency of the time change in RSRP when the communication quality is degraded by the shielding (especially, the shielding due to geography). FIG. 9C illustrates Class#3 where RSPR is increased rapidly after being reduced relatively rapidly. The Class#3 typically corresponds to the tendency of the time change in RSRP when the communication quality is degraded by the shielding (especially, the shielding due to a structure such as a building). FIG. 9D illustrates Class#4 where RSPR is not changed much. The Class#4 typically corresponds to the tendency of the time change in RSRP when the communication quality is not degraded. FIG. 9E illustrates Class#5 where RSPR is increased relatively gradually. The Class#5 typically corresponds to the tendency of the time change in RSRP when the communication quality degraded by the distance attenuation begins to be restored. FIG. 9F illustrates Class#6 where RSPR is increased relatively rapidly. The Class#6 typically corresponds to the tendency of the time change in RSRP when the communication quality degraded by the shielding (especially, the shielding due to geography) is restored.

The data aggregation unit 412 may calculate an index value representing the change velocity of RSRP for each predetermined time interval in a certain period, based on the time-series data SRS#n of RSRP in the certain period. That is, the data aggregation unit 412 divides a certain period into predetermined time intervals, and may calculate an index value representing the change velocity of RSRP in each time interval, by using a data part indicating RSRP in each time interval of the time-series data SSR#n of RSRP in the certain period.

The time interval for calculating the index value representing the change velocity may be fixed. Alternatively, the time interval for calculating the index value representing the change velocity may be variable. That is, the data aggregation unit 412 may set a time interval of a desired length as the time interval for calculating the index value representing the change velocity. As an example, when the delay (specifically, end-to-end delay, and the delay time) is used as the communication quality, the data aggregation unit 412 may set a time interval that is twice the delay time, as the time interval for calculating the index value representing the change velocity. In this case, it is possible to relatively accurately extract a time interval in which the delay is likely to be large (i.e., the communication quality is likely to be degraded). As another example, when the throughput is used as the communication quality, the data aggregation unit 412 may set a time interval with the same time length as that of a throughput calculation cycle (i.e., a period from a last calculation of the throughput to a next calculation of the throughput), as the time interval for calculating the index value representing the change velocity. As another example, when the throughput is used as the communication quality, the data aggregation unit 412 may set a time interval with the same time length as that of a throughput calculation time (i.e., an aggregation period of a data amount for calculating the throughput), as the time interval for calculating the index value representing the change velocity. In these cases, it is possible to relatively accurately extract a time interval in which the throughput is likely to be low (i.e., the communication quality is likely to be degraded). As another example, when the user terminal 2 is provided in a construction machine at a construction site where there is an obstacle, the data aggregation unit 412 may set a time interval with a time length calculated by a mathematical expression of (Size of obstacle+Size of construction machine)/Moving velocity of construction machine, as the time interval for calculating the index value representing the change velocity. As another example, when the user terminal 2 is provided in a construction machine with a GPS function at a construction site where there is an obstacle, the data aggregation unit 412 may set a time interval with a time length calculated by a mathematical expression of (Size of obstacle estimated from map information+Size of construction machine)/Moving velocity of construction machine estimated from GPS, as the time interval for calculating the index value representing the change velocity. In these cases, it is possible to relatively accurately extract a time unit in which the radio wave is likely to be shielded by the obstacle (i.e., the communication quality is likely to be degraded by the shielding). In this paragraph, the symbol of "/" (slash symbol) means division. That is, an expression of "A/B" means a mathematical expression of "A÷B."

FIG. 10 illustrates an example of the input data INP#n including such velocity data. In the example illustrated in FIG. 10, the input data INP#1 are generated based on the time-series data SRS#1 included in the learning data LD#1 illustrated in FIG. 5, and the input data INP#2 are generated based on the time-series data SRS#2 included in the learning data LD#2 illustrated in FIG. 5.

Referring again to FIG. 4, then, the model building unit 413 performs the machine learning for building the estimation model M, by using the input data INP#1 to INP#N generated in the step S12, and the correct answer labels y#1 to y#N included in the learning dataset LDS obtained in the step S11 (step S13). When the data aggregating unit 412 does not generate at least one of the input data INP#1 to INP#N, the model building unit 413 may perform the machine learning for building the estimation model M without using at least one of the input data INP#1 to INP#N that is not generated by the data aggregating unit 412 (furthermore, the correct answer label corresponding to at least one of the input data INP#1 to INP#N that is not generated by the data aggregating unit 412).

In order to perform the machine learning, the model building unit 413 inputs each of the input data INP#1 to INP#N to the estimation model M. As a result, the estimation model M outputs estimation results y'#1 to y'#N respectively corresponding to the input data INP#1 to INP#N. Specifically, as illustrated in FIG. 11 illustrating the estimation results y'#1 to y'#N of the estimation model M, the estimation model M outputs an estimation result y'#n of the root cause of degradation of the communication quality between the wireless base station 1 and the user terminal 2#n at each time t. FIG. 11 illustrates the estimation result y'#1 by the estimation model M to which the input data INP#1 are inputted (i.e., the estimation result y'#1 of the root cause of degradation of the communication quality between the wireless base station 1 and the user terminal 2#1), and the estimation result y'#2 by the estimation model M to which the input data INP#2 are inputted (i.e., the estimation result y'#2 of the root cause of degradation of the communication quality between the wireless base station 1 and the user terminal 2#2). In the example illustrated in FIG. 11, the estimation model M outputs, as the estimation result y'#n, data in which, of a plurality of root cause candidates that are assumed to be the root cause of degradation of the communication quality, at least one root cause candidate that is estimated to be most probable as the actual root cause of degradation is labeled with "1," and at least one root cause candidate that is hardly estimated to be the actual root cause of degradation is labeled with "0." Then, the model building unit 413 updates the parameters of the estimation model M based on a loss function about an error between the correct answer label y#n and the estimation result y'#n outputted by the estimation model M. That is, the model building unit 413 updates the parameters of the estimation model M, based on a loss function about an error between the correct answer label y#1 and the estimation result y'#1 outputted by the estimation model M, an error between the correct answer label y#2 and the estimation result y'#2 outputted by the estimation model M, . . . , and an error between the correct answer label y#N and the estimation result y'#N outputted by the estimation model M. At this time, for example, the model building unit 413 may update the parameters of the estimation model M by using an existing method for performing the machine learning. An example of the existing method for performing the machine learning is error back propagation. As a result, the estimation model M is built.

<2-2> Root Cause Estimation Operation Performed by Root Cause Estimation Apparatus 3

Figure 12:
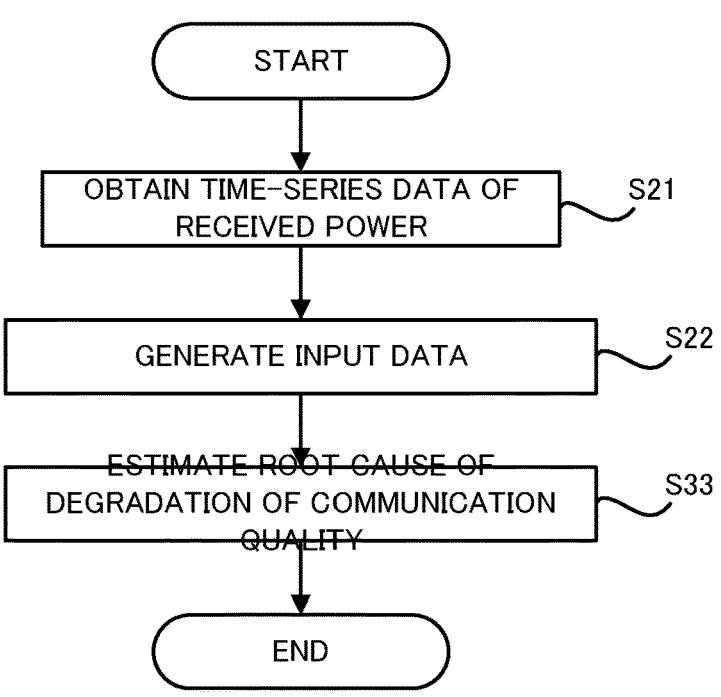
FIG. 12 is a flowchart illustrating a flow of a root cause estimation operation performed by the root cause estimation apparatus.

Next, the root cause estimation operation performed by the root cause estimation apparatus 3 will be described with reference to FIG. 12. FIG. 12 is a flowchart illustrating a flow of the root cause estimation operation performed by the root cause estimation apparatus 3. The root cause estimation apparatus 3 typically performs the root cause estimation operation illustrated in FIG. 12, in a situation where the wireless base station 1 and the N user terminals 2 provided in the location of actual use actually perform the wireless communication.

As illustrated in FIG. 12, when it is desired to estimate the root cause of degradation of the communication quality between the wireless base station 1 and the user terminal 2#n, the data acquisition unit 311 obtains the time-series data SRS#n of the received power RP#n from the wireless base station 1 (step S21). The time-series data SRS#n of the received power RP#n are already described when in the explanation of the model building operation, and a detailed description thereof will be thus omitted here.

Then, the data aggregation unit 312 generates the input data INP#n based on the time-series data SRS#n obtained in the step S21 (step S22). The operation of generating the input data INP#n in the step S22 may be the same as the operation of generating the input data INP#n in the step S12 in FIG. 4 described above (i.e., the operation of generating the input data INP#n in the model building operation). Therefore, a detailed description of the step S22 will be omitted.

Then, the root cause estimation unit 313 estimates the root cause of degradation of the communication quality between the wireless base station 1 and the user terminal 2#n, by using the input data INP#n generated in the step S22 and the estimation model M built by the model building apparatus 4 (step S33). Specifically, the root cause estimation unit 313 inputs the input data INP#n generated in the step S22 to the estimation model M. As a result, the estimation model M outputs the estimation result y'#n of the root cause of degradation of the communication quality between the wireless base station 1 and the user terminal 2#n at each time t.

As described above, the root cause estimation unit 313 estimates the root cause of degradation of the communication quality between the wireless base station 1 and the user terminal 2#n. For example, when the estimation result y'#1 illustrated in FIG. 11 described in the model building operation is outputted from the estimation model M, the root cause estimation unit 313 estimates that the communication quality is not degraded between the wireless base station 1 and the user terminal 2#1 from the time t#1-1 to the time t#1-11. Furthermore, the root cause estimation unit 313 estimates that the actual root cause of degradation of the communication quality between the wireless base station 1 and the user terminal 2#1 is the "shielding" from the time t#1-12 to the time t#1-23. Similarly, for example, when the estimation result y'#2 illustrated in FIG. 11 described in the model building operation is outputted from the estimation model M, the root cause estimation unit 313 estimates that the root cause of degradation of the communication quality between the wireless base station 1 and the user terminal 2#2 is the "fading" from the time t#2-1 to the time t#2-22. In addition, the root cause estimation unit 313 estimates that the root cause of degradation of the communication quality between the wireless base station 1 and the user terminal 2#2 is the "distance attenuation" from the time t#2-22 to the time t#2-36.

In the example illustrated in FIG. 11, the root cause estimation unit 313 estimates a single root cause of degradation as the root cause of degradation of the communication quality between the wireless base station 1 and the user terminal 2#n. As also described in the model building operation, however, the communication quality between the wireless base station 1 and the user terminal 2#n may be degraded by a plurality of root cause of degradations. Therefore, the root cause estimation unit 313 may estimate a plurality of root cause of degradations as the root cause of degradation of the communication quality between the wireless base station 1 and the user terminal 2#n.

When the root cause estimation unit 313 estimates the root cause of degradation, the root cause estimation unit 313 may store historical data including information about the estimated root cause of degradation, in the storage apparatus 32 or the like. In this instance, the root cause estimation unit 313 may store, in the storage apparatus 32 or the like, such historical data that the information about the estimated root cause of degradation is associated with information about a position in which the communication quality is degraded (e.g., information about a position of the user terminal 2#n and information that can be specified by a GPS apparatus provided in the user terminal 2#n). The root cause estimation unit 313 may store, in the storage apparatus 32 or the like, such historical data that the information about the estimated root cause of degradation is associated with information about a time when the communication quality is degraded. The root cause estimation unit 313 may store, in the storage apparatus 32 or the like, such historical data that the information about the estimated root cause of degradation, the information about the position in which the communication quality is degraded, and the information about the time in which the communication quality is degraded, are associated with each other.

<3> TECHNICAL EFFECT OF WIRELESS COMMUNICATION SYSTEM SYS

As described above, in the example embodiment, the model building apparatus 4 is configured to build the estimation model M capable of estimating the root cause of degradation of the communication quality between the wireless base station 1 and the user terminal 2#n. Consequently, the root cause estimation apparatus 3 is allowed to estimate the root cause of degradation of the communication quality between the wireless base station 1 and the user terminal 2#n, by using the estimation model M built by the model building apparatus 4. Consequently, an operator or apparatus that restores the degraded communication quality is allowed to select an appropriate measure to retore the degraded communication quality and to take the selected measure, based on the root cause of degradation of the communication quality estimated by the root cause estimation apparatus 3. For example, when the root cause estimation apparatus 3 estimates that the root cause of degradation of the communication quality between the wireless base station 1 and the user terminal 2#n is the distance attenuation, the operator or apparatus that restores the degraded communication quality is allowed to select a measure to adjust the parameters of the wireless base station 1, as the appropriate measure to restore the degraded communication quality, and is allowed to perform the selected measure. For example, it is allowed to select an appropriate measure to restore the quality, and is allowed to take the selected measure. For example, when the root cause estimation apparatus 3 estimates that the root cause of degradation of the communication quality between the wireless base station 1 and the user terminal 2#n is the shielding, the operator or apparatus that restores the degraded communication quality is allowed to select at least one of a measure to change an installation position of the wireless base station 1 and a measure to change a mobile path of the user terminal 2, as the appropriate measure to restore the degraded communication quality, and is allowed to take the selected measure. For example, when the root cause estimation apparatus 3 estimates that the root cause of degradation of the communication quality between the wireless base station 1 and the user terminal 2#n is the fading, the operator or apparatus that restores the degraded communication quality is allowed to select a measure to provide again a station installation design of the wireless base station 1, as the appropriate measure to restore the degraded communication quality, and is allowed to take the selected measure.

Especially in the example embodiment, the model building apparatus 4 builds the estimation model M, by using the input data INP#n including the change data about the degree of the change in RSRP per unit time (e.g., the velocity data about the change velocity of RSRP). Consequently, as described above, the model building apparatus 4 is allowed to build the estimation model M capable of estimating whether the root cause of degradation of the communication quality is the distance attenuation or the shielding with higher accuracy. Therefore, the root cause estimation apparatus 3 is allowed to estimate whether the root cause of degradation of the communication quality is the distance attenuation or the shielding with higher accuracy. Specifically, the root cause estimation apparatus 3 typically estimates that the root cause of degradation of the communication quality is the distance attenuation, when the velocity data indicate that the change velocity of RSRP is less than a predetermined velocity (i.e., that RSRP is changed relatively gradually). That is, the root cause estimation apparatus 3 estimates that the root cause of degradation of the communication quality is the distance attenuation, when the change data indicate that the degree of the change in RSRP per unit time is relatively small. On the other hand, the root cause estimation apparatus 3 typically estimates that the root cause of degradation of the communication quality is the shielding, when the velocity data indicate that the change velocity of RSRP is greater than the predetermined velocity (i.e., RSRP is changed relatively rapidly). That is, the root cause estimation apparatus 3 estimates that the root cause of degradation of the communication quality is the shielding, when the change data indicate that the degree of the change in RSRP per unit time is relatively large.

<4> SPECIFIC EXAMPLES OF APPLICATION OF WIRELESS COMMUNICATION SYSTEM SYS

The wireless communication system SYS may be applied to a system including a movable moving body and a control server that controls movement of the moving body. In this case, the user terminal 2 may be mounted on the moving body, and the control server may transmit a control signal for controlling the movement of the moving body to the user terminal 2 (i.e., to the moving body on which the user terminal 2 is mounted) through the wireless base station 1.

An example of the moving body is a construction machine used for work at a construction site. Another example of the moving body is a conveyance apparatus (e.g., AGV: Automatic Guided Vehicle) for carrying or conveying a target object to be conveyed at at least one of a plant and a warehouse.

The control server may receive information about a position of the moving body, through the wireless base station 1 and the user terminal 2. For example, when the moving body includes a position identification apparatus that is configured to identify the position of the moving body, the user terminal 2 mounted on the moving body may transmit the information about the position of the moving body identified by the position identification apparatus, to the control server through the wireless base station 1.

The position identification apparatus may include an apparatus that is configured to identify the position of the moving body, by receiving a GPS signal from a GPS satellite. The position identification apparatus may include an apparatus that is configured to identify the position of the moving body, by receiving a signal from a transmitter that transmits the signal within a predetermined range (i.e., an apparatus that is configured to identify the position of the moving body by using a beacon). The position identification apparatus may include an apparatus that is configured to identify the position of the moving body (e.g., a radar or a LIDAR) by detecting a return light of a measurement light (e.g., a laser light) emitted from the position identification apparatus (i.e., a return light from an object with which measurement light is irradiated). The position identification apparatus may include an apparatus that is configured to identify the position the moving body (e.g., a radar or a LIDAR) by detecting return sound waves of ultrasonic waves emitted from the position identification apparatus (i.e., return sound waves from an object to which the ultrasonic waves are applied). The position identification apparatus may include an apparatus that is configured to identify the position of the moving body by using a RFID (Radio Frequency IDentifier) disposed at a predetermined position. The position identification apparatus may include an apparatus that is configured to identify the position of the moving body by using a video captured by a camera. The position identification apparatus may include an apparatus that is configured to identify the position of the moving body by using terrestrial magnetism. The position identification apparatus may include an apparatus that is configured to identify the position of the moving body by analyzing detection results of various sensors provided in the moving body. The position identification apparatus may include an apparatus that is configured to identify the position of the moving body by analyzing the radio wave received by the user terminal 2 mounted on the moving body. The position apparatus may include an apparatus that is configured to identify the position of the moving body by using an IMES (Indoor MEssaging System).

<5> MODIFIED EXAMPLES

In the above description, in order to build the estimation model M capable of estimating whether the root cause of degradation of the communication quality is the distance attenuation or the shielding with higher accuracy, the model building apparatus 4 uses the input data INP#n including the velocity data about the change velocity of RSRP. The model building apparatus 4, however, may use the input data INP#n including the velocity data about the change velocity of the received power RP#n that is different from that of RSRP, thereby to build the estimation model M capable of estimating whether the root cause of degradation of the communication quality is the distance attenuation or the shielding with higher accuracy. Specifically, RSRP corresponding to the received power RP#n of the wireless communication between the wireless base station 1 and the user terminal 2#n is an index value measured in a situation where another wireless base station 1 that is different from the wireless base station 1 that wirelessly communicates with the user terminal 2#n stops transmitting a signal that can be used to measure the received power RP#n (e.g., a secondary signal (SS) or a Channel State Information (CSI) reference signal). That is, it can be said that RSRP is an example of pure received power RP#n between the wireless base station 1 and the user terminal 2#n in which an influence of the other wireless base station 1 that is different from the wireless base station 1 that wirelessly communicates with the user terminal 2#n is eliminated. For this reason, the model building apparatus 4 may use the input data INP#n including the velocity data about the change velocity of any received power RP#n between the wireless base station 1 and the user terminal 2#n in which the influence of the other wireless base station 1 that is different from the wireless base station 1 that wirelessly communicates with the user terminal 2#n is eliminated, thereby to build the estimation model M capable of estimating whether the root cause of degradation of the communication quality is the distance attenuation or the shielding with higher accuracy. In this instance, the root cause estimation apparatus 3 may generate the input data INP#n including the velocity data about the change velocity of any received power RP#n between the wireless base station 1 and the user terminal 2#n in which the influence of the other wireless base station 1 that is different from the wireless base station 1 that wirelessly communicates with the user terminal 2#n is eliminated, and may estimate the root cause of degradation of the communication quality between the wireless base station 1 and the user terminal 2#n by using the generated input data INP#n.

Figure 13:
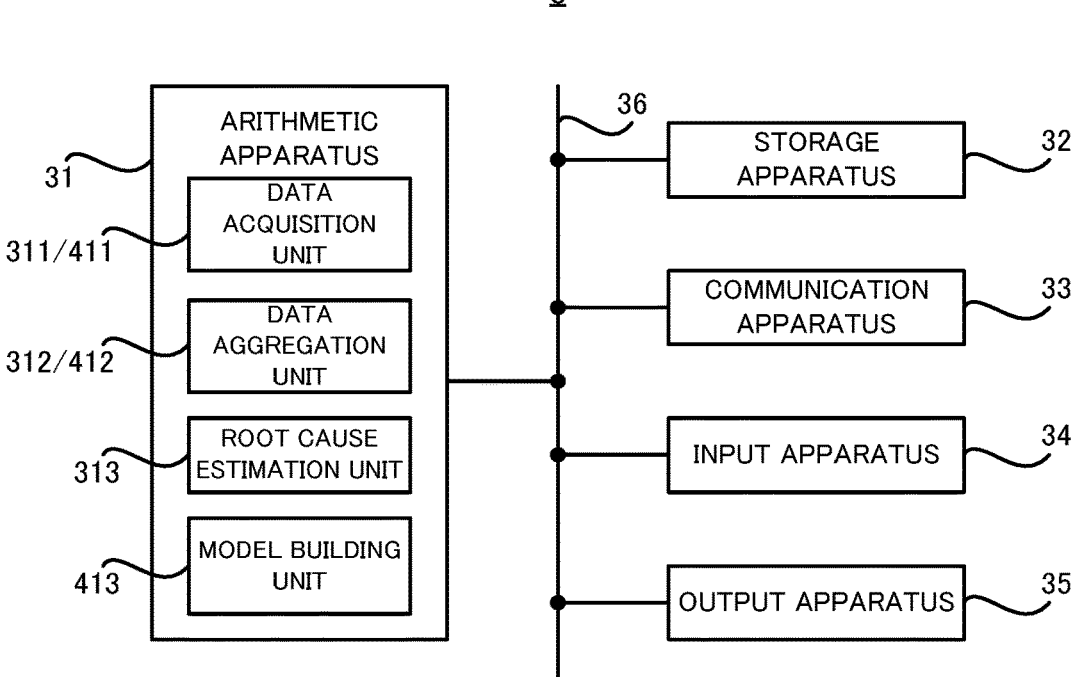
FIG. 13 is a block diagram illustrating a configuration of a root cause estimation apparatus that is also configured to function as the model building apparatus.

In the above description, the wireless communication system SYS separately includes the root cause estimation apparatus 3 and the model building apparatus 4. The wireless communication system SYS, however, may include the root cause estimation apparatus 3 that is also configured to function as the model building apparatus 4, in addition to or instead of separately including the root cause estimation apparatus 3 and the model building apparatus 4. In this instance, as illustrated in FIG. 13 that illustrates a configuration of the root cause estimation apparatus 3 that is also configured to function as the model building apparatus 4, the root cause estimation apparatus 3 that is also configured to function as the model building apparatus 4 may include the data acquisition unit 311 that is also configured to function as the data acquisition unit 411, the data aggregation unit 312 that is also configured to function as the data aggregation unit 412, the root cause estimation unit 313, and the model building unit 413. The root cause estimation apparatus 3 that is also configured to function as the model building apparatus 4, is substantially equivalent to the model building apparatus 4 that is also configured to function as the root cause estimation apparatus 3.

In the above description, the wireless communication system SYS includes the wireless base station 1 as a specific example of the "first wireless station", and the user terminal 2 as a specific example of the "second wireless station". The wireless communication system SYS, however, may include any wireless station of a different type from that of the wireless base station 1, as an example embodiment of the "first wireless station". The wireless communication system SYS may include any wireless station of a different type from that of the user terminal 2, as a specific example embodiment of the "second wireless station". For example, when the wireless communication system SYS is a wireless LAN (Local Area Network) system conforming to IEEE802.11, the wireless communication system SYS may include an access point (so-called master unit), as an example of the "first wireless station", and may include a wireless terminal (so-called slave unit) that is configured to wirelessly communicate with the access point, as an example of the "second wireless station".

<6> SUPPLEMENTARY NOTES

Supplementary Note 1

A model building apparatus that builds an estimation model for estimating a root cause of degradation of communication quality between a first wireless station and a second wireless station, the model building apparatus including:
    an acquisition unit that obtains, from the first wireless station, time-series data of received power of wireless communication between the first wireless station and the second wireless station;
    a generation unit that generates input data including change data about a degree of a change in the received power per unit time, based on the time-series data; and
    a building unit that builds the estimation model for estimating the root cause of degradation from the input data, by machine learning using the input data.

Supplementary Note 2

The model building apparatus according to Supplementary Note 1, wherein the change data include data about at least one of a coefficient of an approximate expression for approximating the received power, a variance of the received power, and a standard deviation of the received power.

Supplementary Note 3

The model building apparatus according to Supplementary Note 1 or 2, wherein the change data include data about a classification result obtained by classifying the received power in accordance with the degree of the change in the received power per unit time.

Supplementary Note 4

The model building apparatus according to any one of Supplementary Notes 1 to 3, wherein the received power includes received power between the first wireless station and the second wireless station in which an influence of another first wireless station that is different from the first wireless station is eliminated.

Supplementary Note 5

The model building apparatus according to any one of Supplementary Notes 1 to 4, wherein the received power includes at least one of RSSI (Received Signal Strength Indicator), RSRP (Reference Signal Received Power), RSRQ (Reference Signal Received Quality), and SINR (Signal to Interference plus Noise Ratio).

Supplementary Note 6

The model building apparatus according to any one of Supplementary Notes 1 to 5, wherein the generation unit generates the input data including the change data about the degree of the change in the received power per unit time, in a variable predetermined period.

Supplementary Note 7

The model building apparatus according to any one of Supplementary Notes 1 to 6, wherein the estimation model estimates whether the root cause of degradation is such a first factor that the communication quality is degraded by distance attenuation, or such a second factor that the communication quality is degraded by shielding.

Supplementary Note 8

A root cause estimation apparatus that estimates a root cause of degradation of communication quality between a first wireless station and a second wireless station, the root cause estimation apparatus including:
    an acquisition unit that obtains, from the first wireless station, time-series data of received power of wireless communication between the first wireless station and the second wireless station;
    a generation unit that generates input data including change data about a degree of a change in the received power per unit time, based on the time-series data; and
    an estimation unit that estimates the root cause of degradation, by using the input data and an estimation model that is built by machine learning and that is for estimating the root cause of degradation from the input data.

Supplementary Note 9

The root cause estimation apparatus according to Supplementary Note 8, wherein the change data include data about at least one of a coefficient of an approximate expression for approximating the received power, a variance of the received power, and a standard deviation of the received power.

Supplementary Note 10

The root cause estimation apparatus according to Supplementary Note 8 or 9, wherein the change data include data about a classification result obtained by classifying the received power in accordance with the degree of the change in the received power per unit time.

Supplementary Note 11

The root cause estimation apparatus according to any one of Supplementary Notes 8 to 10, wherein the received power includes received power between the first wireless station and the second wireless station in which an influence of another first wireless station that is different from the first wireless station is eliminated.

Supplementary Note 12

The root cause estimation apparatus according to any one of Supplementary Notes 8 to 11, wherein the received power includes at least one of RSSI (Received Signal Strength Indicator), RSRP (Reference Signal Received Power), RSRQ (Reference Signal Received Quality), and SINR (Signal to Interference plus Noise Ratio).

Supplementary Note 13

The root cause estimation apparatus according to any one of Supplementary Notes 8 to 12, wherein the generation unit generates the input data including the change data about the degree of the change in the received power per unit time, in a variable predetermined period.

Supplementary Note 14

The root cause estimation apparatus according to any one of Supplementary Notes 8 to 13, wherein the estimation unit estimates whether the root cause of degradation is such a first root cause that the communication quality is degraded by distance attenuation, or such a second root cause that the communication quality is degraded by shielding.

Supplementary Note 15

The root cause estimation apparatus according to any one of Supplementary Notes 8 to 14, wherein the change data are velocity data about a change velocity of the received power, and the estimation unit (i) estimates that the root cause of degradation is such a first root cause that the communication quality is degraded by distance attenuation, when the velocity data indicate that the change velocity is less than a predetermined velocity, and (ii) estimates that the root cause of degradation is such a second root cause that the communication quality is degraded by shielding, when the velocity data indicate that the change velocity is greater than the predetermined velocity.

Supplementary Note 16

A model building method of building an estimation model for estimating a root cause of degradation of communication quality between a first wireless station and a second wireless station, the model building method including:

obtaining, from the first wireless station, time-series data of received power of wireless communication between the first wireless station and the second wireless station;

generating input data including change data about a degree of a change in the received power per unit time, based on the time-series data; and building the estimation model for estimating the root cause of degradation from the input data, by machine learning using the input data.

Supplementary Note 17

A root cause estimation method of estimating a root cause of degradation of communication quality between a first wireless station and a second wireless station, the root cause estimation method including:

obtaining, from the first wireless station, time-series data of received power of wireless communication between the first wireless station and the second wireless station;

generating input data including change data about a degree of a change in the received power per unit time, based on the time-series data; and estimating the root cause of degradation, by using the input data and an estimation model that is built by machine learning and that is for estimating the root cause of degradation from the input data.

Supplementary Note 18

A recording medium that records thereon a computer program that allows a computer to execute a model building method of building an estimation model for estimating a root cause of degradation of communication quality between a first wireless station and a second wireless station, the model building method including:

obtaining, from the first wireless station, time-series data of received power of wireless communication between the first wireless station and the second wireless station;

generating input data including change data about a degree of a change in the received power per unit time, based on the time-series data; and building the estimation model for estimating the root cause of degradation from the input data, by machine learning using the input data.

Supplementary Note 19

A recording medium that records thereon a computer program that allows a computer to execute a root cause estimation method of estimating a root cause of degradation of communication quality between a first wireless station and a second wireless station, the root cause estimation method including:

obtaining, from the first wireless station, time-series data of received power of wireless communication between the first wireless station and the second wireless station;

generating input data including change data about a degree of a change in the received power per unit time, based on the time-series data; and estimating the root cause of degradation, by using the input data and an estimation model that is built by machine learning and that is for estimating the root cause of degradation from the input data.

At least a part of the constituent components of the above-described example embodiment can be combined with at least another part of the constituent components of the above-described example embodiment, as appropriate. A part of the constituent components of the above-described example embodiment may not be used. Furthermore, to the extent permitted by law, all the references (e.g., publications) cited in this disclosure are incorporate by reference as a part of the description of this disclosure.

This disclosure is not limited to the examples described above and is allowed to be changed, if desired, without departing from the essence or spirit of this disclosure which can be read from the claims and the entire identification. A model building apparatus and a model building method, a root cause estimation apparatus and a root cause estimation method, and a recording medium with such modifications are also intended to be within the technical scope of this disclosure.

DESCRIPTION OF REFERENCE CODES

SYS Wireless communication system
1 Wireless base station
2 User terminal
3 Root cause estimation apparatus
31 Arithmetic apparatus
311 Data acquisition unit
312 Data aggregation unit
313 Root cause estimation unit
4 Model building apparatus
41 Arithmetic apparatus
411 Data acquisition unit
412 Data aggregation unit
413 Model building unit
RP received power SRS time-series data
INP input data
LDS learning dataset
LD learning data

What is claimed is:

1. A root cause estimation apparatus that estimates at least one root cause of degradation of communication quality between a first wireless station and a second wireless station, the root cause estimation apparatus comprising:

at least one memory configured to store instructions; and at least one processor configured to execute the instructions to:

obtain, from the first wireless station, time-series data of received power of wireless communication between the first wireless station and the second wireless station, generate input data including change data about a degree of a change in the received power per unit time, based on the time-series data, and estimate the at least one root cause of degradation and that the communication quality is not degraded, by using the input data and an estimation model that is built by machine learning and that is trained by using training data that includes: the time-series data for training, and correct labels corresponding to the time-series data for training and indicating that the at least one root cause of degradation and the communication quality is not degraded, and that is for estimating, from the input data, the at least one root cause of degradation and that the communication quality is not degraded.

2. The root cause estimation apparatus according to claim 1, wherein the change data include data about at least one of a coefficient of an approximate expression for approximating the received power, a variance of the received power, and a standard deviation of the received power.

3. The root cause estimation apparatus according to claim 1, wherein the change data include data about a classification result obtained by classifying the received power in accordance with the degree of the change in the received power per unit time.

4. The root cause estimation apparatus according to claim 1, wherein the received power includes received power between the first wireless station and the second wireless station in which an influence of another first wireless station that is different from the first wireless station is eliminated.

5. The root cause estimation apparatus according to claim 1, wherein the received power includes at least one of RSSI (Received Signal Strength Indicator), RSRP (Reference Signal Received Power), RSRQ (Reference Signal Received Quality), and SINR (Signal to Interference plus Noise Ratio).

6. The root cause estimation apparatus according to claim 1, wherein the at least one processor is configured to execute the instructions to generate the input data including the change data about the degree of the change in the received power per unit time, in a variable predetermined period.

7. The root cause estimation apparatus according to claim 1, wherein the at least one processor is configured to execute the instructions to estimate whether the at least one root cause of degradation is at least one of such a first root cause that the communication quality is degraded by distance attenuation, such a second root cause that the communication quality is degraded by shielding, and such a third root cause that the communication quality is degraded by fading.

8. The root cause estimation apparatus according to claim 1, wherein:

the change data are velocity data about a change velocity of the received power, and the at least one processor is configured to execute the instructions toto:

estimate that the at least one root cause of degradation is such a first root cause that the communication quality is degraded by distance attenuation, when the velocity data indicate that the change velocity is less than a predetermined velocity, and estimate that the at least one root cause of degradation is such a second root cause that the communication quality is degraded by shielding, when the velocity data indicate that the change velocity is greater than the predetermined velocity.

9. A root cause estimation method of estimating a at least one root cause of degradation of communication quality between a first wireless station and a second wireless station, the root cause estimation method comprising:

obtaining, from the first wireless station, time-series data of received power of wireless communication between the first wireless station and the second wireless station;

generating input data including change data about a degree of a change in the received power per unit time, based on the time-series data; and estimating the at least one root cause of degradation and that the communication quality is not degraded, by using the input data and an estimation model that is built by machine learning and that is trained by using training data that includes: the time-series data for training, and correct labels corresponding to the time-series data for training and indicating that the at least one root cause of degradation and the communication quality is not degraded, and that is for estimating, from the input data, the at least one root cause of degradation and that the communication quality is not degraded.

10. A non-transitory recording medium that records thereon a computer program that allows a computer to execute a root cause estimation method of estimating at least one root cause of degradation of communication quality between a first wireless station and a second wireless station, the root cause estimation method including:

obtaining, from the first wireless station, time-series data of received power of wireless communication between the first wireless station and the second wireless station;

generating input data including change data about a degree of a change in the received power per unit time, based on the time-series data; and estimating the at least one root cause of degradation and that the communication quality is not degraded, by using the input data and an estimation model that is built by machine learning and that is trained by using training data that includes: the time-series data for training, and correct labels corresponding to the time-series data for training and indicating that the at least one root cause of degradation and the communication quality is not degraded, and that is for estimating, from the input data, the at least one root cause of degradation and that the communication quality is not degraded.

* * * * *